US006600975B2

(12) United States Patent
Moriguchi et al.

(10) Patent No.: US 6,600,975 B2
(45) Date of Patent: Jul. 29, 2003

(54) IN-VEHICLE COMMUNICATION DEVICE AND COMMUNICATION CONTROL METHOD

(75) Inventors: Ken-ichi Moriguchi, Neyagawa (JP); Masaaki Tomoda, Suita (JP); Teruaki Ata, Ibaraki (JP); Takeshi Hatakeyama, Neyagawa (JP); Tsuyoshi Kindo, Sennangun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/153,926

(22) Filed: May 24, 2002

(65) Prior Publication Data

US 2002/0177928 A1 Nov. 28, 2002

(30) Foreign Application Priority Data

May 28, 2001 (JP) ...................................... 2001-158668

(51) Int. Cl.[7] ................................................ H04B 7/85
(52) U.S. Cl. ........................... 701/1; 701/36; 342/357.1
(58) Field of Search ................................ 701/1, 29, 36; 348/14.01, 14.02, 14.06; 455/422, 426; 342/357.1

(56) References Cited

U.S. PATENT DOCUMENTS 6,295,449 B1 * 9/2001 Westerlage et al. ......... 455/422
6,320,535 B1 * 11/2001 Hillman ................... 342/357.1
6,396,531 B1 * 5/2002 Gerszberg et al. ....... 348/14.01

FOREIGN PATENT DOCUMENTS

JP 11-004190 1/1999

* cited by examiner

*Primary Examiner*—Richard M. Camby
(74) *Attorney, Agent, or Firm*—Wenderoth, Lind & Ponack, L.L.P.

(57) ABSTRACT

An in-vehicle communication device 300 that automatically answers a caller device that sends a call when a telephone device 100 located in a vehicle receives the call comprising: in-vehicle sensors 311~316 that detect vehicle conditions, a communication interface 340 for the telephone device 100, and a control device 380 that controls the telephone device 100 via the communication interface 340, wherein the control device 380 acquires the vehicle conditions which are detected by the in-vehicle sensors 311~316, judges whether a driver's answering the call is dangerous or not based on the acquired vehicle conditions when the control device 380 detects the call to the telephone device 100, prepares an answer message including vehicle information that depends upon a running condition of the vehicle at the time when the driver's answering the call is judged to be dangerous, and sends the prepared answer message to the caller device.

26 Claims, 20 Drawing Sheets

Fig. 4

| recording number | telephone number | name | e-mail address |
|---|---|---|---|
| 1 | 090△□◇◇ | YAMADA | yamada@xxx.yyy.jp |
| 2 | 090□◇△○ | SUZUKI | suzuki@zzz.yyy.jp |
| | | | |
| | | | |
| N | 090△□○◇ | MATSUSHITA | matsushita@zzz.yyy.jp |

Setting for Automatic Answer Message  3711

| Danger Judgment | Vehicle Information | Answer Type |
| --- | --- | --- |
| 3711A | 3711B | 3711C |

Specify a sensor used for danger judgment.

- ☑ speed sensor — 3711Aa
- ☑ acceleration sensor — 3711Ab
- ☑ rudder sensor — 3711Ac
- ☐ parking brake condition detecting sensor — 3711Ad
- ☐ GPS device — 3711Ae
- ☐ 3D gyro sensor — 3711Af
- ☐ zone detection — 3711Ag

...

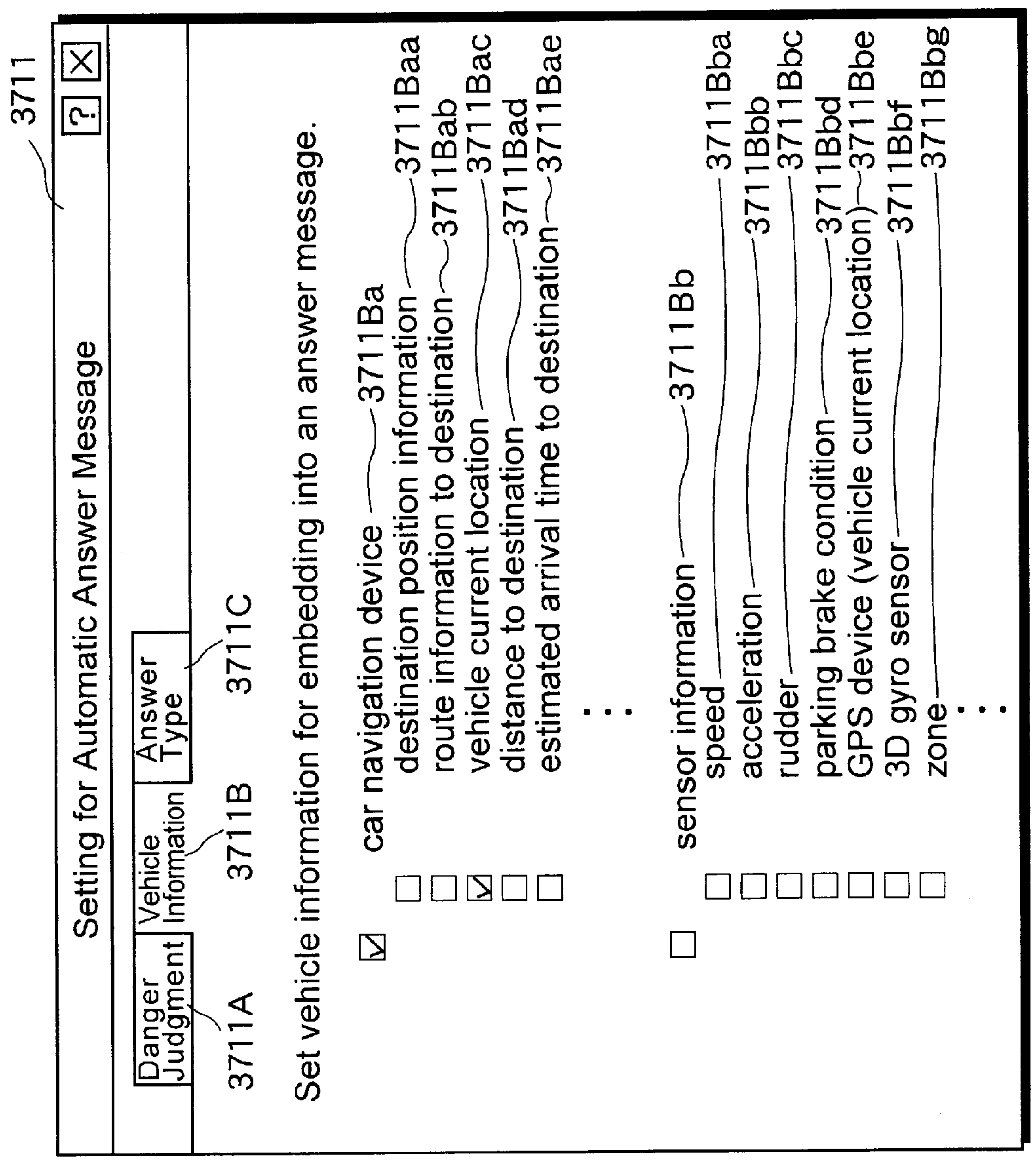

Fig. 6

| Danger Judgment | Vehicle Information | Answer Type |
|---|---|---|

3711A　　　3711B　　　3711C

Setting for Automatic Answer Message — 3711

Set vehicle information for embedding into an answer message.

☑ car navigation device — 3711Ba
- ☐ destination position information — 3711Baa
- ☐ route information to destination — 3711Bab
- ☑ vehicle current location — 3711Bac
- ☐ distance to destination — 3711Bad
- ☐ estimated arrival time to destination — 3711Bae
...

☐ sensor information — 3711Bb
- ☐ speed — 3711Bba
- ☐ acceleration — 3711Bbb
- ☐ rudder — 3711Bbc
- ☐ parking brake condition — 3711Bbd
- ☐ GPS device (vehicle current location) — 3711Bbe
- ☐ 3D gyro sensor — 3711Bbf
- ☐ zone — 3711Bbg
...

Fig. 8

Answer Message Setting Table 372

| | | | | |
|---|---|---|---|---|
| Danger Judgment | speed sensor | acceleration sensor | rudder sensor | parking condition ··· |
| | 1 | 1 | 1 | 0 |
| Vehicle Information | car navigation device | destination position information | ··· | vehicle current location |
| | 1 | 0 | ··· | 1 |
| | sensor information | speed sensor | ··· | ··· |
| | 0 | 0 | ··· | ··· |
| Answer Type | answer mode flag | header (From field) | header (Subject field) | — |
| | 1 | moriguti@xxx. yyy. jp | automatic answer e-mail | — |

IN-VEHICLE COMMUNICATION DEVICE AND COMMUNICATION CONTROL METHOD

BACKGROUND OF THE INVENTION

1. Field of the Invention

The present invention relates to an in-vehicle communication device and a communication control method, etc. that can automatically answer a caller device that sends a call when a telephone device located in a vehicle receives the call.

2. Description of the Prior Art

In recent years, accidents caused by drivers who talk on telephones in their hands during driving have occurred frequently. Therefore, various kinds of hands-free systems that make it possible to talk on the telephones without holding them have been proposed. However, it causes a driver a distraction and increases danger to answer a call and talk when there is the incoming call during driving, for example, while he is driving at a high speed.

Therefore, in order to reduce danger involving an incoming call and talking on the phone during driving, the in-vehicle mobile phone system that stops a ring tone and records a caller's message after reproducing an automatic voice answer message when there is an incoming call during driving has been developed (the Japanese Laid-Open Patent Application No. H11-4190).

FIG. 1 is a block diagram that shows the conventional in-vehicle mobile phone system that is disclosed in the above Japanese Laid-Open Patent Application.

As shown in FIG. 1, the in-vehicle mobile phone system 900 includes an antenna 910, a mobile phone unit 920, in-vehicle kit 930 (a control block 931, a recording/reproducing unit 932), an ECU (engine control unit) 940, a parking brake unit 950, a microphone 960 and a loudspeaker 970.

The control block 931 decides whether a vehicle is running or not based on speed information which is outputted from the engine control unit (ECU) 940 and information on operational condition of a parking brake which is outputted from the parking brake unit 950. When there is an incoming call on the mobile phone unit 920 in the running vehicle (that is, the speed is more than 0 and the parking brake is not in operation), the control block 931 switches the ring tone of the mobile phone unit 920 to stop or turn down, and counts the number of calls received during driving. It sends a message that "I am now driving" which is recorded in advance in the recording/reproducing unit 932 to the caller, and then records the caller's message. When the vehicle stops, the control block 931 reproduces the caller's messages which are recorded in the recording/reproducing unit 932 using the loudspeaker 970 based on the number of the calls.

This system makes it possible to reduce danger involving an incoming call and talking on the phone during driving and deliver the message that "I am now driving" to the caller without answering the call.

However, the conventional hands-free system sends the caller a fixed message, a message that "I am now driving", for example, every time there comes an incoming call during driving. Therefore, according to the conventional system, the caller can only understand that the receiver (the driver) is in a difficulty in answering the call because he is driving, but cannot obtain more detailed information. As a result, the caller has to call the driver over and over after a certain time of period. Also, the caller may be worried about the driver all the time until he gets a call from the driver because he cannot understand the situation of the driver and the vehicle.

SUMMARY OF THE INVENTION

Accordingly, the present invention is available to solve these problems, and it is the object of the present invention to provide an in-vehicle communication device and a communication control method that make it possible to prevent a caller from calling repeatedly or becoming uselessly worried even if a driver cannot answer the call because he is driving.

In order to achieve above-mentioned object, the in-vehicle communication device according to the present invention is an in-vehicle communication device that automatically answers a caller device that sends a call when a telephone device located in a vehicle receives the call including: an in-vehicle sensor that detects a vehicle condition; a communication interface for the telephone device; and a control device that controls the telephone device via the communication interface, wherein the control device acquires a vehicle condition which is detected by the in-vehicle sensor, judges whether a driver's answering the call is dangerous or not based on the acquired vehicle condition when the control device detects the call to the telephone device, prepares an answer message including vehicle information that depends upon a running condition of the vehicle at the time when the control device judges that the driver's answering the call is dangerous, and sends the prepared answer message to the caller device.

As a result, when the driver cannot answer the call, not a fixed message but the information that depends upon the running condition of the vehicle at that time is sent back to the caller. Accordingly, the caller can obtain fresher and more information on the conditions of the driver and the vehicle than the fixed message and is relieved from anxiety and uneasiness.

Here, the control device may judge that the driver's answering the call is dangerous when the vehicle condition detected by the in-vehicle sensor goes beyond a predetermined threshold value. For example, the vehicle condition is judged based on at least one of a speed, an acceleration, a steering wheel angle, an operational condition of a parking brake, vertical, lateral and longitudinal movements of the vehicle, and whether the vehicle is in a dangerous zone or not.

As a result, a dangerous condition is judged using not only the operational condition of the parking brake but also the information indicating the danger level such as the speed and the acceleration, so it can be accurately judged whether the driver's answering the call is dangerous or not. Accordingly, troubles can be avoided such that an automatic answer works for the incoming call to the driver in a not-dangerous condition, or on the contrary, the driver has to answer the call because the automatic answer does not work even in a dangerous condition.

Also, the threshold value may be variable. As a result, by setting the threshold value himself, the driver can set the automatic answer in accordance with his individuality such as his driving technique and experience.

Also, the in-vehicle communication device further includes a map information storing unit operable to store map information that specifies divided zones indicating whether the driver's answering the call is dangerous or not, wherein the control device may use, as the vehicle condition, whether a current location of the vehicle is in a dangerous zone specified by the map information or not. As a result, since it is judged to be a dangerous condition and the automatic answer works for the incoming call, for example, when the vehicle is located in a dangerous zone such as an entrance to a tunnel and an intersection, the safety of the driver is secured.

Also, the in-vehicle communication device further includes an in-vehicle information terminal device which is located in a vehicle, wherein the control device may prepare the answer message by reading out vehicle information from the in-vehicle information terminal device. For example, the in-vehicle information terminal device is a car navigation device, and the control device may use, as vehicle information, (A) at least one of (i) a destination, (ii) a route to the destination, (iii) a current location, (iv) a distance to the destination and (v) an estimated arrival time to the destination, which are held by the car navigation device; or (B) a combination of the vehicle condition and at least one of (i) (ii) (iii) (iv) and (v).

As a result, since the caller can not only understand the condition that the driver is driving but also anticipate to some extent how long the condition will continue, he can wait for the driver's answer without feeling anxiety or uneasiness.

Also, the control device may send the answer message in a form of an e-mail to the caller device. As a result, since the caller can obtain the information on the vehicle's running condition by the e-mail, reception errors can be avoided such as missing hearing or hearing wrong which may occur in the case of the automatic voice answer. That is, the caller can obtain the driver's condition without fail.

Here, the control device may acquire an e-mail address of the caller from the telephone device, and send the e-mail to the acquired e-mail address. And the in-vehicle communication device further includes an address book storing unit operable to store in advance an address book in which a telephone number and a corresponding e-mail address are registered, wherein the control device may specify an e-mail address of the caller device by referring to the address book stored in the address book storing unit based on a telephone number of the caller, and send the e-mail to the e-mail address of the caller.

As a result, the e-mail address of the caller can automatically acquired when the driver receives a call, and the automatic answer by an e-mail becomes possible.

The present invention can be realized not only as the above-mentioned in-vehicle communication device, but also as a communication control method for an automatic answer for a hands-free device, or a program including the communication control method as a step. The program can, of course, be distributed via a recording medium such as a CD-ROM or a transmission medium such as the Internet. Note that Bluetooth is a registered trademark of The Bluetooth SIG Inc.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a diagram that shows a structure sample of an address book 121 that the mobile phone 100 holds.

FIG. 6 is a diagram that shows a structure sample of a setting screen for an automatic answer message (for setting vehicle information).

FIG. 8 is a diagram that shows a structure sample of an answer message setting table 372 that is stored in the storing device 370.

DESCRIPTION OF THE PREFERRED EMBODIMENTS

The hands-free system according to the present embodiments of the present invention will be explained below with reference to the figures.

The First Embodiment

Figure 1:
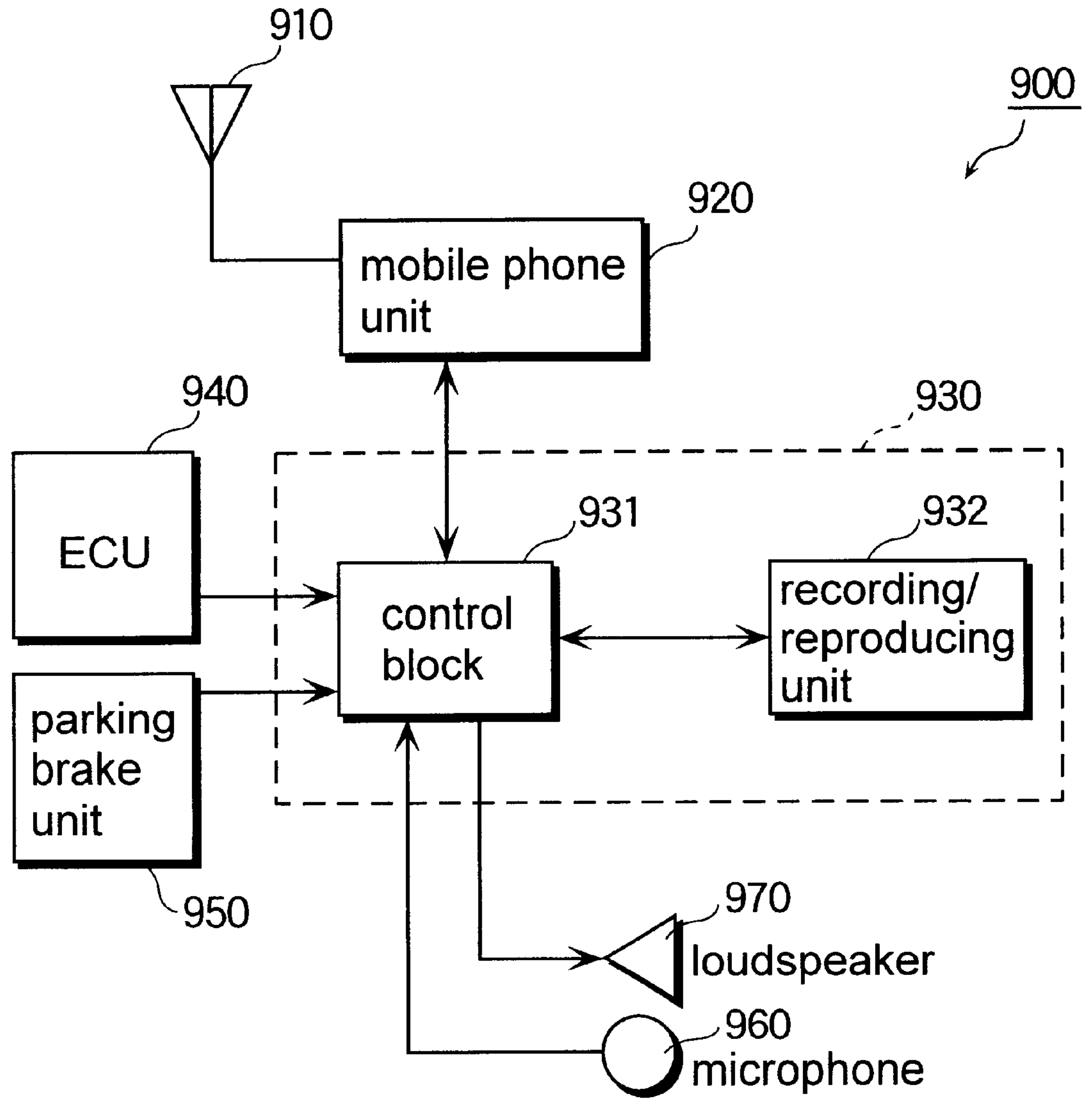
FIG. 1 is a block diagram that shows a structure of the conventional in-vehicle mobile phone system.
Figure 2:
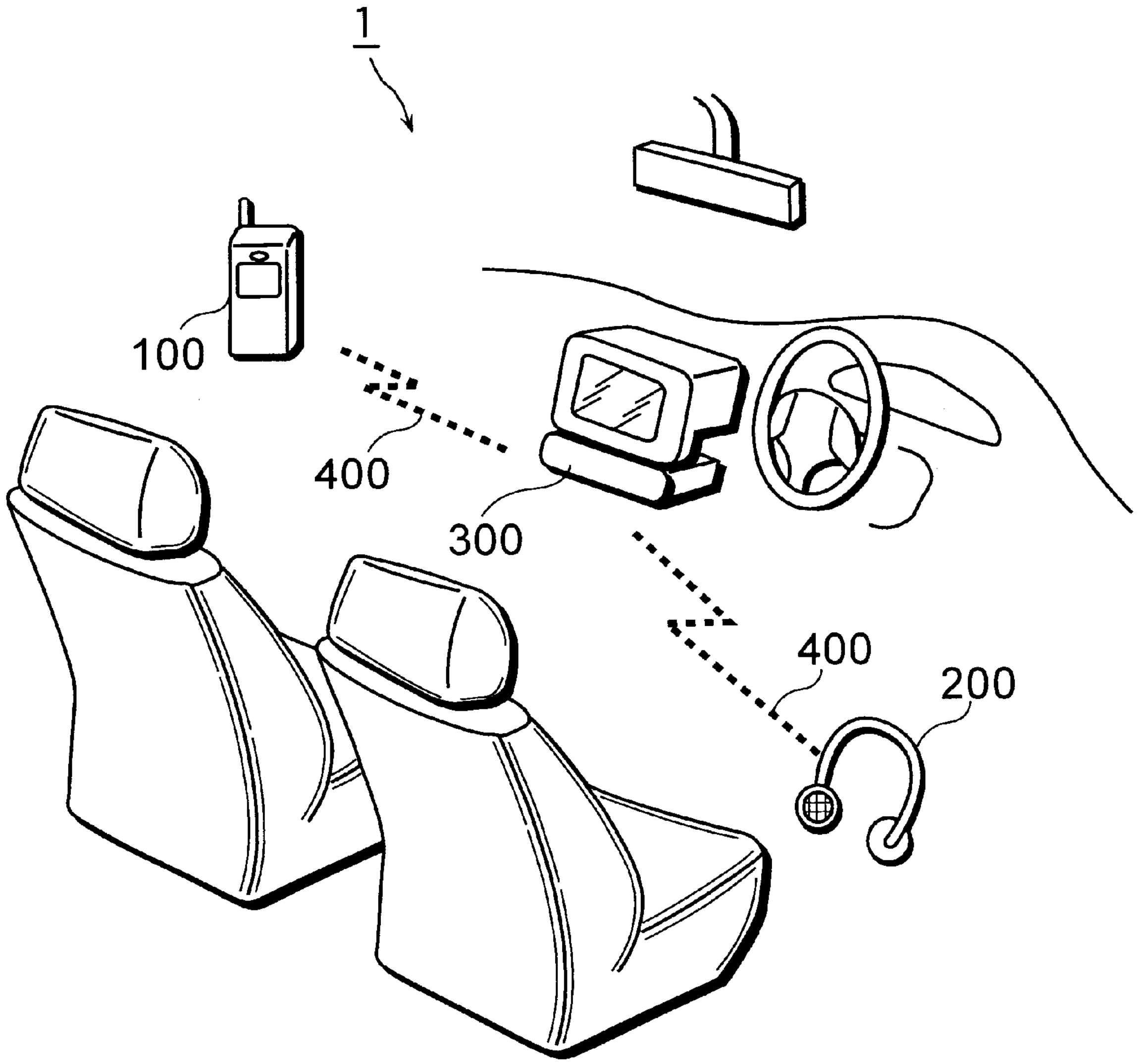
FIG. 2 is a diagram that shows an overall structure of a hands-free system according to the first embodiment of the present invention.

FIG. 2 is a diagram that shows an overall structure of a hands-free system according to the first embodiment of the present invention.

As shown in this figure, the hands-free system 1 includes a mobile phone 100, an earphone-type microphone 200, an in-vehicle communication device 300, and a wireless communication path 400 that connects the mobile phone 100, the earphone-type microphone 200 and the in-vehicle communication device 300 so as to communicate with each other.

The mobile phone 100 is a portable telephone set that can be brought into a vehicle. This mobile phone 100 makes it possible to have a real-time voice conversation with a communication partner in a remote place via a telephone network, etc., have access to the Internet or send and receive an e-mail, and capture a digital image to send an e-mail with a photo. The mobile phone 100 has Bluetooth function, by which various types of data can be communicated with the in-vehicle communication device 300 and the earphone-type microphone 200 without a telephone network.

The earphone-type microphone 200 is a voice input and output device for hands-free conversation. The earphone-type microphone 200 connects with the in-vehicle communication device 300 and others by air via the wireless communication path 400, inputs a voice, sends voice data to the in-vehicle communication device 300 via the wireless communication path 400, and converts the voice data received from the in-vehicle communication device 300 into a voice to be outputted.

The in-vehicle communication device 300 is a computer device that controls the mobile phone 100, the earphone-type microphone 200 and others overall. When the mobile phone receives an incoming call, the in-vehicle communication device 300 judges whether it is dangerous or not for a driver to answer the call. And when it judges it to be dangerous, it prepares an answer message including vehicle information that depends on the driving condition at the ever-changing timing and sends the prepared answer message as a voice or an e-mail via the mobile phone 100.

Figure 3:
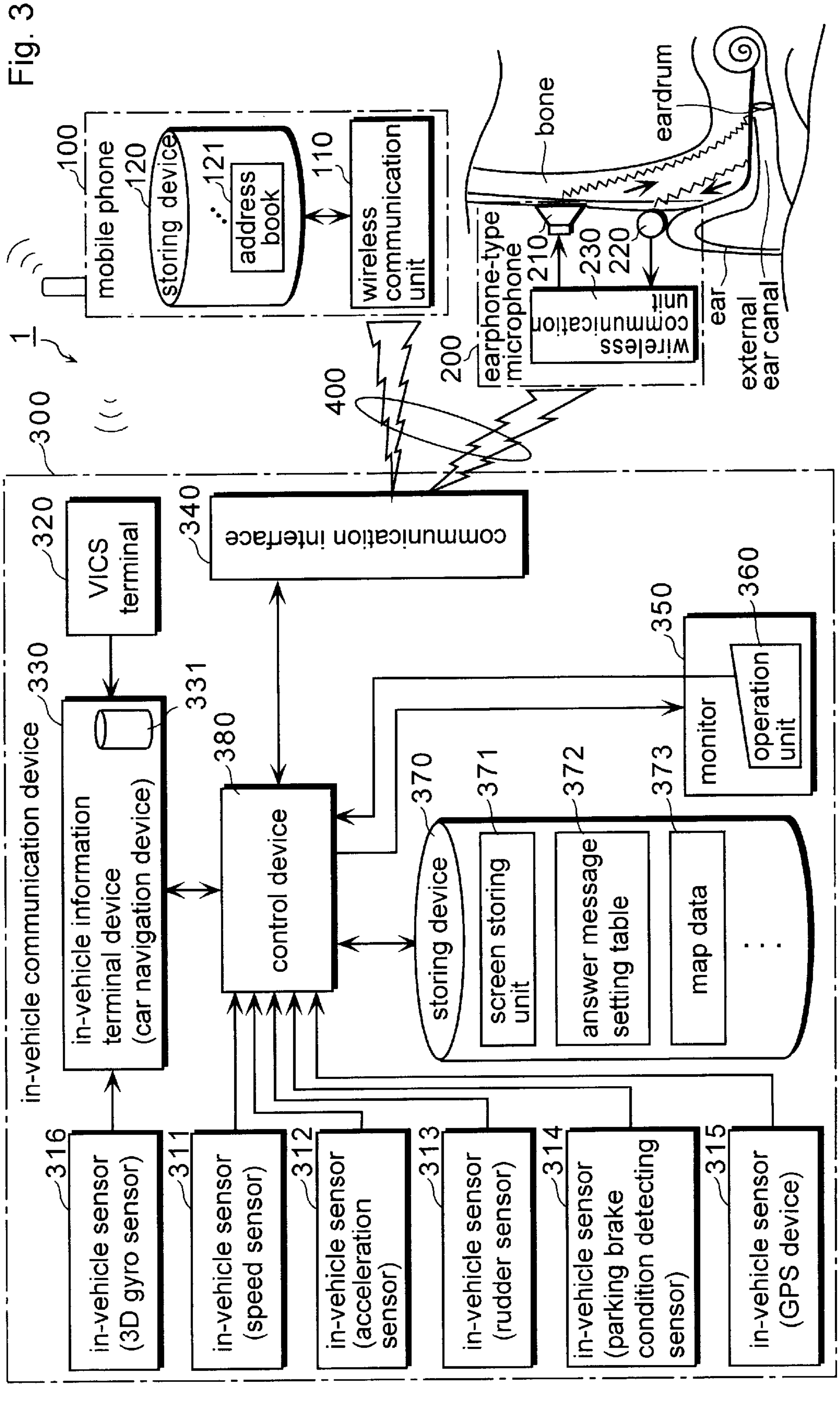
FIG. 3 is a block diagram that shows a functional structure of a mobile phone 100, an earphone-type microphone 200 and an in-vehicle communication device 300 as shown in FIG. 2.

FIG. 3 is a block diagram that shows a functional structure of the mobile phone 100, the earphone-type microphone 200 and the in-vehicle communication device 300 as shown in FIG. 2. Note that the wireless communication path 400 is also shown here.

The mobile phone 100 includes a wireless communication unit 110, a storing device 120, etc. in itself.

The wireless communication unit 110 including a Bluetooth module, for example, forms a short-range (about 10 m, for instance) Piconet, that is, the wireless communication path 400, with the in-vehicle communication device 300 and the earphone-type microphone 200 using electromagnetic waves within the ISM band of 2.4 GHz, so as to send and receive a control signal and data with each other via the wireless communication path 400.

The storing device 120 stores an address book 121, an incoming call history, an outgoing call history, etc. The address book 121 including a recording number, a telephone number, a name and an e-mail address, as shown in FIG. 4, makes it possible to call up a telephone number and an e-mail address if necessary.

The earphone-type microphone 200 is in a headphone form, and includes a loudspeaker 210, a microphone 220 and a wireless communication unit 230. Note that the earphone-type microphone 200 may be in a head-gear form or an ear-hang form such as a hearing aid.

The loudspeaker 210 is a bone-conducting loudspeaker that conducts vibrations of voice signals to a bone so as to transmit a voice directly to an acoustic organ (eardrum). This bone-conducting loudspeaker makes it possible to make an ear open and hear the surrounding voices and sounds at the same time.

The microphone 220 is a bone-conducting microphone that converts vibrations of a living body which is conducted via a bone into voice signals.

The wireless communication unit 230 including a Bluetooth module, for example, makes it possible to connect with the mobile phone 100 by air via the wireless communication path 400 and the in-vehicle communication device 300 so as to realize a hands-free conversation with hearing outside voices and sounds, but without being masked by such voices and sounds.

The in-vehicle communication device 300 includes a plurality of (six in this figure) in-vehicle sensors for detecting the vehicle condition (a speed sensor 311, an acceleration sensor 312, a rudder sensor 313, a parking brake condition detecting sensor 314, a GPS (Global Positioning System) device 315 and a 3D gyro sensor 316, for example), an in-vehicle information terminal device 330, a VICS (Vehicle Information and Communication System) terminal 320, a communication interface 340, a monitor 350, an operation unit 360, a storing device 370, a control device 380, etc.

The speed sensor 311 detects the vehicle speed. The acceleration sensor 312 detects the vehicle acceleration. The rudder sensor 313 detects the angle of the steering wheel. The parking brake condition detecting sensor 314 detects whether the parking brake is in operation or not. The GPS device 315 detects the current location of the vehicle using airwaves from a satellite. The 3D gyro sensor 316 detects the vertical, lateral and longitudinal movements for correcting the current location.

Note that the in-vehicle sensor is not always connected directly to the control device 380, but it may be connected indirectly to the control device 380 via a device (such as the in-vehicle information terminal device) as in the case of the 3D gyro sensor 316. Also, although 6 sensors are included in the first embodiment, any one of them, any two to five of them, or seven or more in-vehicle sensors may be included.

The VICS terminal 320 is a terminal device that receives the real-time information such as a traffic jam, an accident, a construction and vacant parking space provided by a medium such as a wave beacon, a light beacon and FM multiplex broadcasting.

The in-vehicle information terminal device 330 is an information terminal located in a vehicle that collects and transmits various types of information, and is realized as a car navigation device, for example. When the driver sets up the departure point and the destination, the in-vehicle information terminal device (it is also referred as "car navigation device" hereinafter) 330 picks out the best route between them, calculates the current location, the branch point, the distance up to the branch point, the distance up to the destination, etc. on that route, corrects the distance up to the branch point and the distance up to the destination based on the vertical movements detected by the 3D gyro sensor 316, and calculates the estimated arrival time to destination based on the traffic information obtained from the VICS terminal 320. The car navigation device 330 holds the departure point and the destination set by the driver, the selected route, the current location, the branch point, the distance up to the branch point and the distance up to the destination on that route, and the estimated arrival time to destination as the vehicle information in the storing device 331.

The communication interface 340 is an interface for connecting the mobile phone 100 and the earphone-type microphone 200 by air. The communication interface 340 including a Bluetooth module, for example, controls the incoming and outgoing calls of the mobile phone 100 via the interface itself and relays the sending and receiving of the voice data between the mobile phone 100 and the earphone-type microphone 200. More specifically, the communication interface 340 is the master of Piconet (wireless communication path 400), and it is triggered by the driver's bringing the mobile phone 100 into the vehicle to search for a new device to be connected to the Piconet, find and confirm the mobile phone 100, and then connect the new device and the mobile phone 100 as the slaves so as to communicate with each other.

The monitor 350 including an LCD, for example, displays various types of images such as a map outputted from the car navigation device 330 and operation buttons for various operations.

The operation unit 360 including a touch panel or the like attached on the surface of the monitor 350, accepts the driver's input operations.

The storing device 370 holds a screen storing device 371 that stores a screen for setting an automatic answer message in advance, an answer message setting table 372 that holds the contents set by the driver using the setting screen of the automatic answer message, map data 373 that specifies divided zones according to whether it is dangerous or not for the driver to answer the call, etc.

The control device 380 includes a ROM (Read Only Memory) that holds a program for executing the hands-free system in advance, a RAM (Random Access Memory) that provides a work area for deploying the program in executing it, a CPU (Central Processing Unit) that executes the program deployed on the RAM, etc. The CPU executes the program deployed on the RAM so as to perform control of each module and sending and receiving data, and to send and receive a control signal and a data signal to and from each unit connected to the CPU. More specifically, the CPU reads out the screens for setting the automatic answer message as shown in FIG. 5~FIG. 7 from the screen storing unit 371 of the storing device 370 to display them on the monitor 350, accepts the driver's operations to store the answer message setting table 372 in which the setting contents are embedded in the storing device 370, and judges whether it is dangerous or not for the driver to answer the call based on the information set on the answer message setting table 372 when the mobile phone 100 receives the call.

Figure 5:
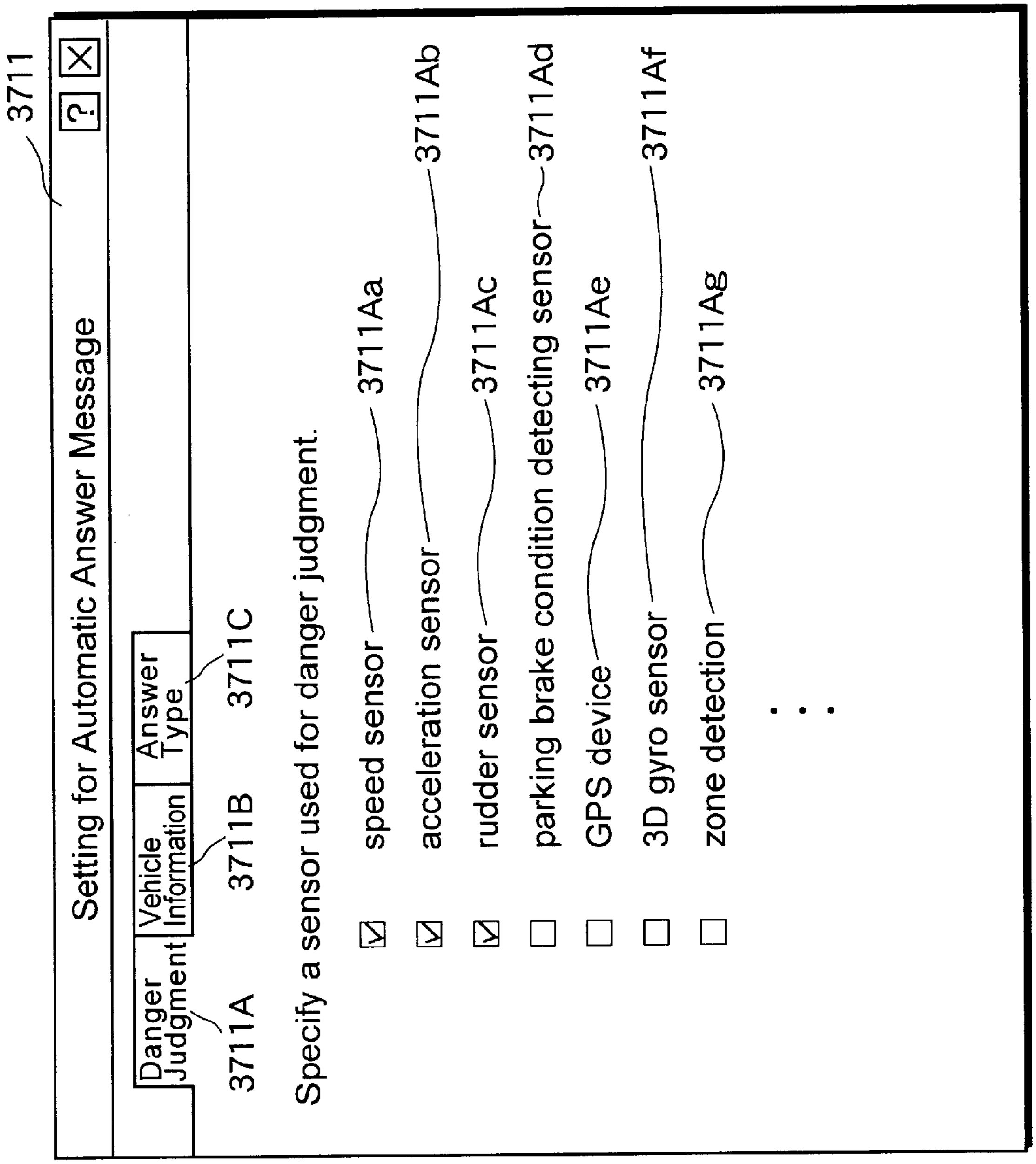
FIG. 5 is a diagram that shows a structure sample of a setting screen for an automatic answer message (for setting a danger judgment) that is stored in a storing device 370.
Figure 7:
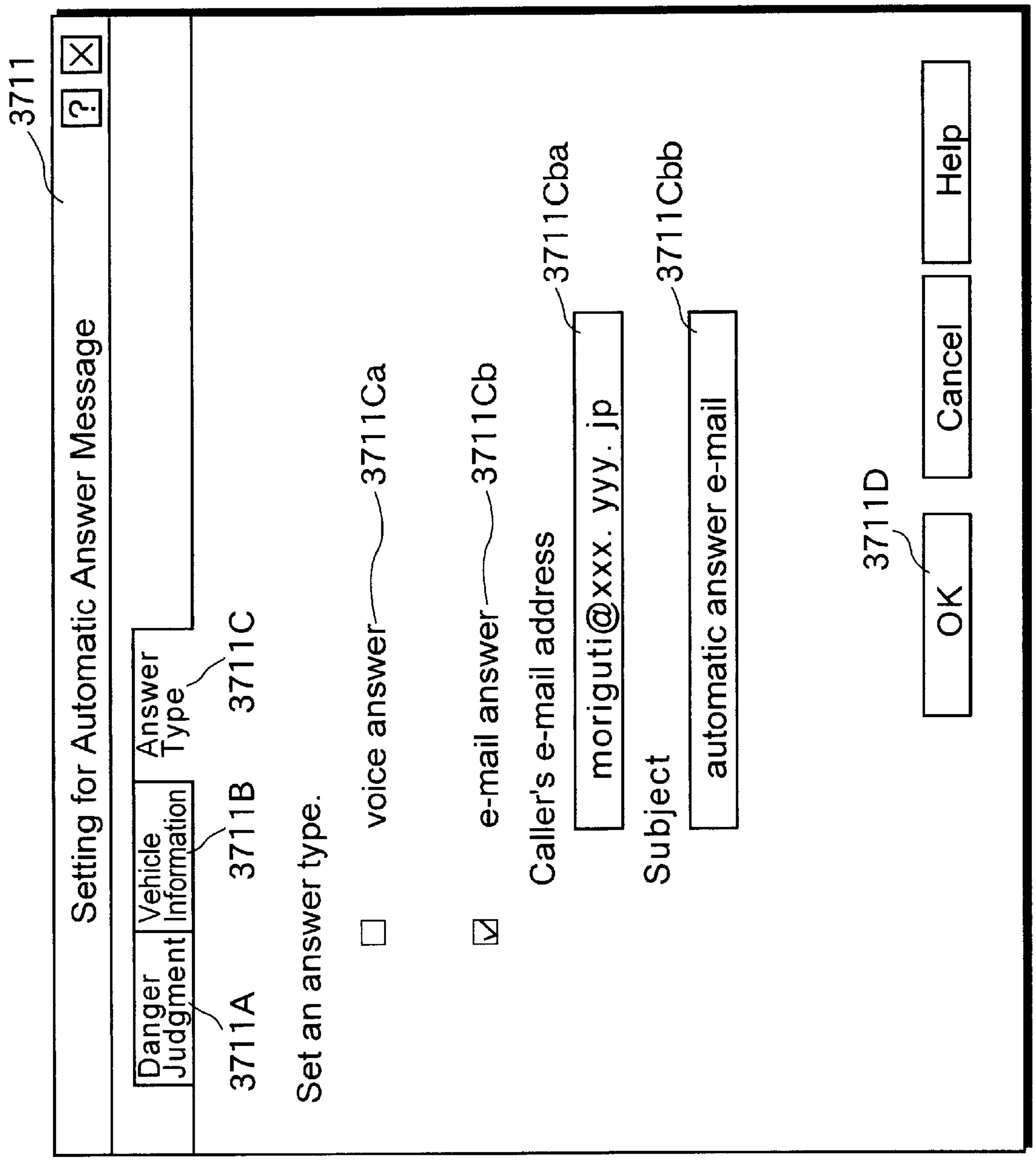
FIG. 7 is a diagram that shows a structure sample of a setting screen for an automatic answer message (for setting an answer type).

FIG. 5~FIG. 7 are diagrams that show structure samples of the setting screens for the automatic answer message 3711 that are stored in the screen storing unit 371 stored in the storing device 370. Note that, among the setting screens for the automatic answer message, FIG. 5 shows a screen for setting danger judgment, FIG. 6 shows a screen for setting vehicle information, and FIG. 7 shows a screen for setting an answer type, respectively.

The setting screen for the automatic answer message 3711 as shown in FIG. 5 (the screen for setting danger judgment) is displayed by a click of the button of "Setting for Automatic Answer Message" on the screen not shown here.

The setting screen 3711 (screen for setting danger judgment) includes the title bar of "Setting for Automatic Answer Message", a danger judgment tab 3711A, a vehicle information tab 3711B and an answer type tab 3711C. In FIG. 5, the screen in the case where the danger judgment tab 3711A is clicked is shown. On this screen, there are fields indicating sensors used for danger judgment, that is, a speed sensor 3711Aa, an acceleration sensor 3711Ab, a rudder sensor 3711Ac, a parking brake condition detecting sensor 3711Ad, a GPS device 3711Ae, a 3D gyro sensor 3711Af, a zone detection 3711Ag, etc. and boxes corresponding to these fields respectively.

The driver (user) operates the operation unit 360 to check the boxes corresponding to the sensors used for danger judgment. Note that as a default, the boxes of the speed sensor 3711Aa, the acceleration sensor 3711Ab and the rudder sensor 3711Ac, for example, are checked, as shown in FIG. 5. If there is a need to change the sensor used for danger judgment, the user may uncheck the box set as the default and check the desired box. Likewise, if there is no need to change the sensor, the user may click the vehicle information tab 3711B without changing the default.

FIG. 6 displays the setting screen for automatic answer message 3711 (for setting vehicle information) in the case where the vehicle information tab 3711B is clicked.

This setting screen 3711 (for setting vehicle information) roughly includes a car navigation device 3711Ba that is a field for using the information stored in the storing device 331 of the car navigation device 330 as vehicle information, a sensor information 3711Bb that is a field for using the sensor information obtained from the sensors as vehicle information, and the boxes corresponding to these fields respectively.

The car navigation device 3711Ba includes a destination position information 3711Baa, a route information to destination 3711Bab, a vehicle current location 3711Bac, a distance to destination 3711Bad, an estimated arrival time to destination 3711Bae, etc. and the boxes corresponding to these fields respectively. Note that the box for the car navigation device 3711Ba needs to be checked in order to check the boxes of these fields 3711Baa~3711Bae.

The sensor information 3711Bb includes a speed 3711Bba, an acceleration 3711Bbb, a rudder (steering wheel angle) 3711Bbc, a parking brake condition 3711Bbd, a GPS device (vehicle current location) 3711Bbe, a 3D gyro sensor 371Bbf, a zone 3711Bbg, etc. and the boxes. Note that, in order to check the boxes of these fields 3711Bba~3711Bbg, the boxes of the corresponding fields as shown in FIG. 5 as well as the box for the sensor information 3711Bb need to be checked.

The driver (user) operates the operation unit 360 to check the boxes corresponding to the fields used for the vehicle information. Note that as a default, the boxes of the car navigation device 3711Ba and the vehicle current location 3711Bac, for example, are checked in advance, as shown in FIG. 6. If there is a need to change, the user may uncheck the boxes set as the default and check the desired box. Likewise, if there is no need to change, the user may click the answer type tab 3711C without changing the default.

The setting screen for automatic answer message 3711 (for setting the answer type) as shown in FIG. 7 is displayed in the case where the answer type tab 3711C is clicked.

This setting screen 3711 (the answer type setting) includes a voice answer 3711Ca that is a field for the voice answer of the message in which the vehicle information is embedded at the time when it is judged dangerous, an e-mail answer 3711Cb that is a field for the e-mail answer, and the boxes corresponding to these fields respectively. Note that the field for the e-mail answer 3711Cb includes a text box 3711Cba for inputting a sender's e-mail address that is available only when the box is checked, and a text box 3711Cbb for inputting a subject.

The driver (user) operates the operation unit 360 to check the boxes corresponding to the fields used for the answer type. Note that as a default, the boxes corresponding to the box for the voice answer 3711Ca, for example, is checked in advance. If there is no need to change, the user may leave the default as it is. If there is a need to change to the e-mail answer, the user may uncheck the box corresponding to the voice answer 3711Ca, check the box for the e-mail answer 3711Cb as shown in FIG. 7, input text data required for the text boxes 3711Cba and 3711Cbb ("moriguti@xxx.yyy.jp", "automatic answer mail", for example), and click "OK" button 3711D.

When the "OK" button is clicked, the control device 380 prepares an answer message setting table 372 based on the condition set on each screen (a setting for danger judgment, a setting for vehicle information, or a setting for an answer type), and stores the table in the storing device 370.

FIG. 8 is a diagram that shows a sample of the answer message setting table 372.

This figure shows a sample of the answer message setting table 372 under the condition of settings as shown in FIG. 5~FIG. 7. Note that "1" for an answer mode flag here indicates an e-mail answer. Fields for "Header" (a field for "From" and a field for "Subject") are given only in this case, and the contents of the text boxes 3711Cba and 3711Cbb are stored in these fields. Also, "0" for the answer mode flag indicates a voice answer. Furthermore, "1" and "0" for other fields than the answer mode flag indicate "available" and "unavailable", respectively.

When the control device 380 receives from the mobile phone 100 a notice that there is an incoming call, it acquires the detection result of the available sensors based on the record of the danger judgment on the answer message setting table 372, and judges whether it is dangerous or not for the driver to answer the call. When the control device 380 judges it to be dangerous, it acquires the available vehicle information based on the record of the vehicle information, and prepares an answer message that is text data in which the vehicle information is embedded in a template. When the record of the answer type indicates the setting for the voice answer (the answer mode flag="0"), the control device 380 converts the answer message into voice data to send it. On the contrary, when the setting for the e-mail answer is indicated (the answer mode flag ="1"), the control device 380 acquires the caller's e-mail address ("To" field) from the mobile phone 100, and converts the answer message into an e-mail to send it.

Here, under the condition of this answer message setting table 372, only the detection results of the speed sensor 311, the acceleration sensor 312 and the rudder sensor 313 are available for judging whether it is dangerous or not for the driver to answer a call when the mobile phone 100 receives the incoming call. In this case, the control device 380 judges 3 detection signals of these sensors 311~313 overall, and judges whether it is dangerous or not for the driver to answer the call. More specifically, when the speed sensor 311 detects a vehicle speed beyond a threshold value, the acceleration sensor 312 detects an acceleration beyond a threshold value, or the rudder sensor 313 detects a steering wheel angle beyond a threshold value, the control device 380 judges that it is dangerous. Note that these threshold values can be changed within a certain range by the user's operations. As a result, the driver can set the threshold values himself to make the automatic answer suitable for his individuality such as his driving technique and experience. Also, as for the vehicle information which is to be embedded in the answer message, the current location of the car navigation device 330 is only available. In this case, the control device 380 prepares the text data including a template with the current location embedded, that is, the answer message ("I can not answer the call because I am now driving. The current location is XXX."). Then, the control device 380 acquires the caller's e-mail address ("To" field) from the mobile phone 100, and converts the answer message into an e-mail to send it.

In this case, other sensors (such as the parking brake condition detecting sensor 314, the GPS device 315 and the 3D gyro sensor 316) and other vehicle information (such as the map data 373) and the voice answer are not used because they are not set to be available.

Figure 9:
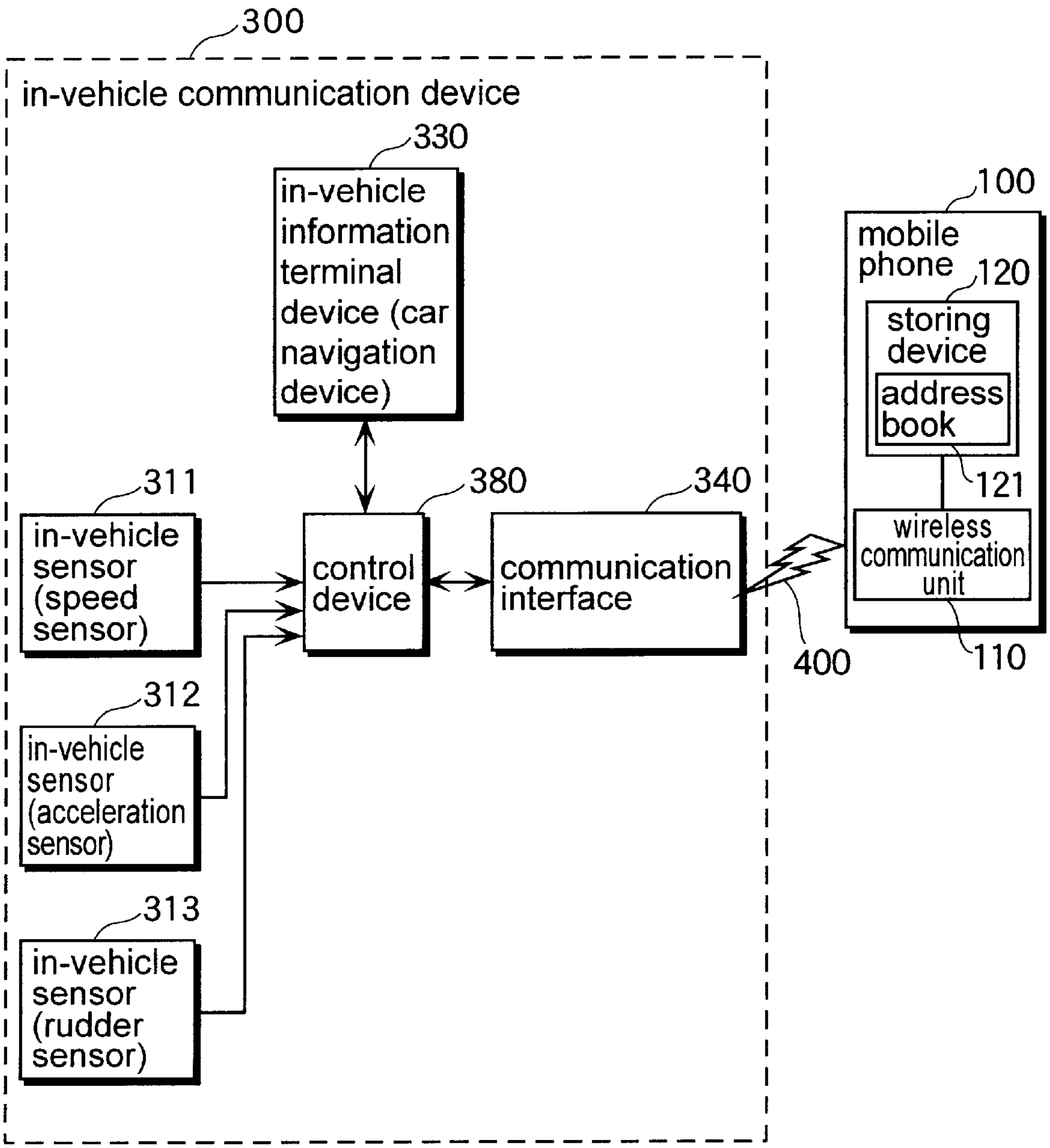
FIG. 9 is a diagram that shows a functional structure of the in-vehicle communication device 300 that is structured according to the setting on the answer message setting table 372 as shown in FIG. 8.

Therefore, the setting as shown in FIG. 8 is equivalent to the structure of the in-vehicle communication device 300 as shown in FIG. 9, in which only the speed sensor 311, the acceleration sensor 312 and the rudder sensor 313 are connected to the control device 380, the control device 380 judges based on the detection results of these 3 sensors only whether it is dangerous or not for the driver to answer a call when the mobile phone 100 receives the incoming call, and when it judges it to be dangerous, it embeds the current location of the vehicle held in the car navigation device 330 into the answer message to send an e-mail to the caller's e-mail address.

When the speed sensor is only set for danger judgment, the speed is only set for the vehicle information, and an e-mail answer is set on the answer message setting table 372, for example, the control device 380 judges it to be dangerous when the speed sensor 311 detects a speed beyond a threshold value. Then, the control device 380 prepares the text data including a template with the speed embedded, that is, the answer message ("I can not answer the call because I am now driving. The current speed is XXX."). Furthermore, the control device 380 acquires the caller's e-mail address ("To" field) from the mobile phone 100, and converts the answer message into an e-mail to send it.

In this case, other sensors (such as the acceleration sensor 312, the rudder sensor 313, the parking brake condition detecting sensor 314, the GPS device 315 and the 3D gyro sensor 316), other vehicle information (such as the map data 373) and the voice answer are not used.

Figure 10:
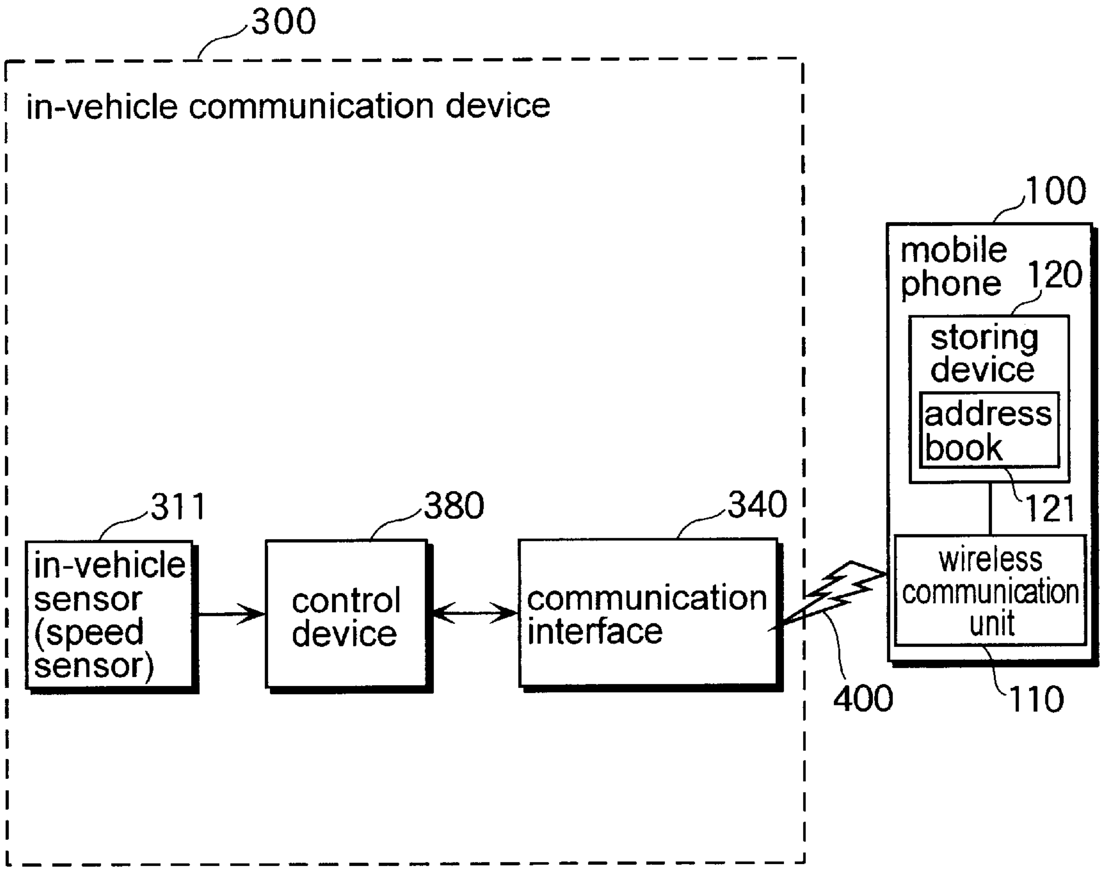
FIG. 10 is a block diagram that shows another functional structure of the in-vehicle communication device 300 that is structured according to the setting on the answer message setting table 372.

Therefore, the structure in the case where the speed sensor is only set for the danger judgment, the speed is only set for the vehicle information, and the e-mail answer is set, is equivalent to that of the in-vehicle communication device 300 as shown in FIG. 10, in which only the speed sensor 311 is connected to the control device 380, the control device 380 judges based on the detection result (vehicle speed) of the speed sensor 311 only whether it is dangerous or not for the driver to answer a call when the mobile phone 100 receives the incoming call, and when it judges it to be dangerous, it embeds the detection result of the speed sensor 311, that is, the vehicle speed into the answer message as the vehicle information to send an e-mail to the caller's e-mail address.

When the speed sensor is only set for danger judgment, the vehicle information (such as the destination and the estimated arrival time) held in the car navigation device 330 is set for the vehicle information, and an e-mail answer is set for the answer type on the answer message setting table 372, for example, the control device 380 judges it to be dangerous when the speed sensor 311 detects a speed beyond a threshold value. Then, the control device 380 prepares the text data including a template with the vehicle information embedded, that is, the answer message ("The destination is ○○○. The estimated arrival time is ΔΔΔ."). Further, the control device 380 acquires the caller's e-mail address ("To" field) from the mobile phone 100, and converts the answer message into an e-mail to send it.

In this case, other sensors (such as the acceleration sensor 312, the rudder sensor 313, the parking brake condition detecting sensor 314, the GPS device 315 and the 3D gyro sensor 316), other vehicle information (such as the map data 373) and the voice answer are not used.

Figure 11:
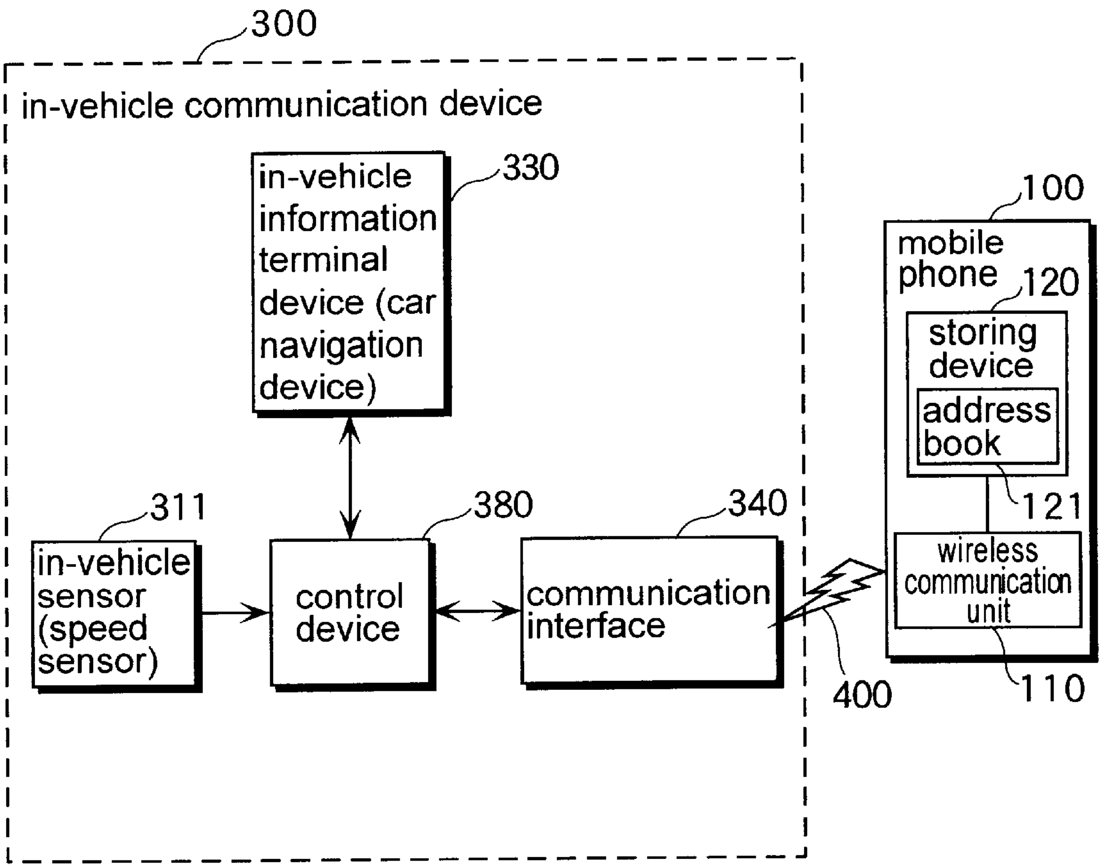
FIG. 11 is a block diagram that shows further another functional structure of the in-vehicle communication device 300 that is structured according to the setting on the answer message setting table 372.

Therefore, the structure in the case where the speed sensor is only set for the danger judgment, the vehicle information of the car navigation device 330 is only set for the vehicle information, and the e-mail answer is set, is equivalent to that of the in-vehicle communication device 300 as shown in FIG. 11, in which only the speed sensor 311 and the car navigation device 330 are connected to the control device 380, the control device 380 judges based on the detection result (vehicle speed) of the speed sensor 311 only whether it is dangerous or not for the driver to answer a call when the mobile phone 100 receives the incoming call, and when it judges it to be dangerous, it embeds the results (such the destination and the estimated arrival time) held by the car navigation device 330 into the answer message to send an e-mail to the caller's e-mail address.

When the 3D gyro sensor connected to the car navigation device 330 as well as the speed sensor are set for the danger judgment, the vehicle current location acquired from the GPS device 315, etc. are set for the vehicle information, and an e-mail answer is set for the answer type on the answer message setting table 372, for example, the control device 380 makes the danger judgment according to these settings. When the control device 380 judges it to be dangerous, it prepares an answer message ("The current location is x x. The destination is ○○○. The estimated arrival time is ΔΔΔ.", for example). And the control device 380 acquires the caller's e-mail address ("To" field) from the mobile phone, and converts the answer message into an e-mail to send it.

In this case, other sensors (such as the acceleration sensor 312, the rudder sensor 313, the parking brake condition detecting sensor 314), other vehicle information (such as the map data 373) and the voice answer are not used.

Figure 12:
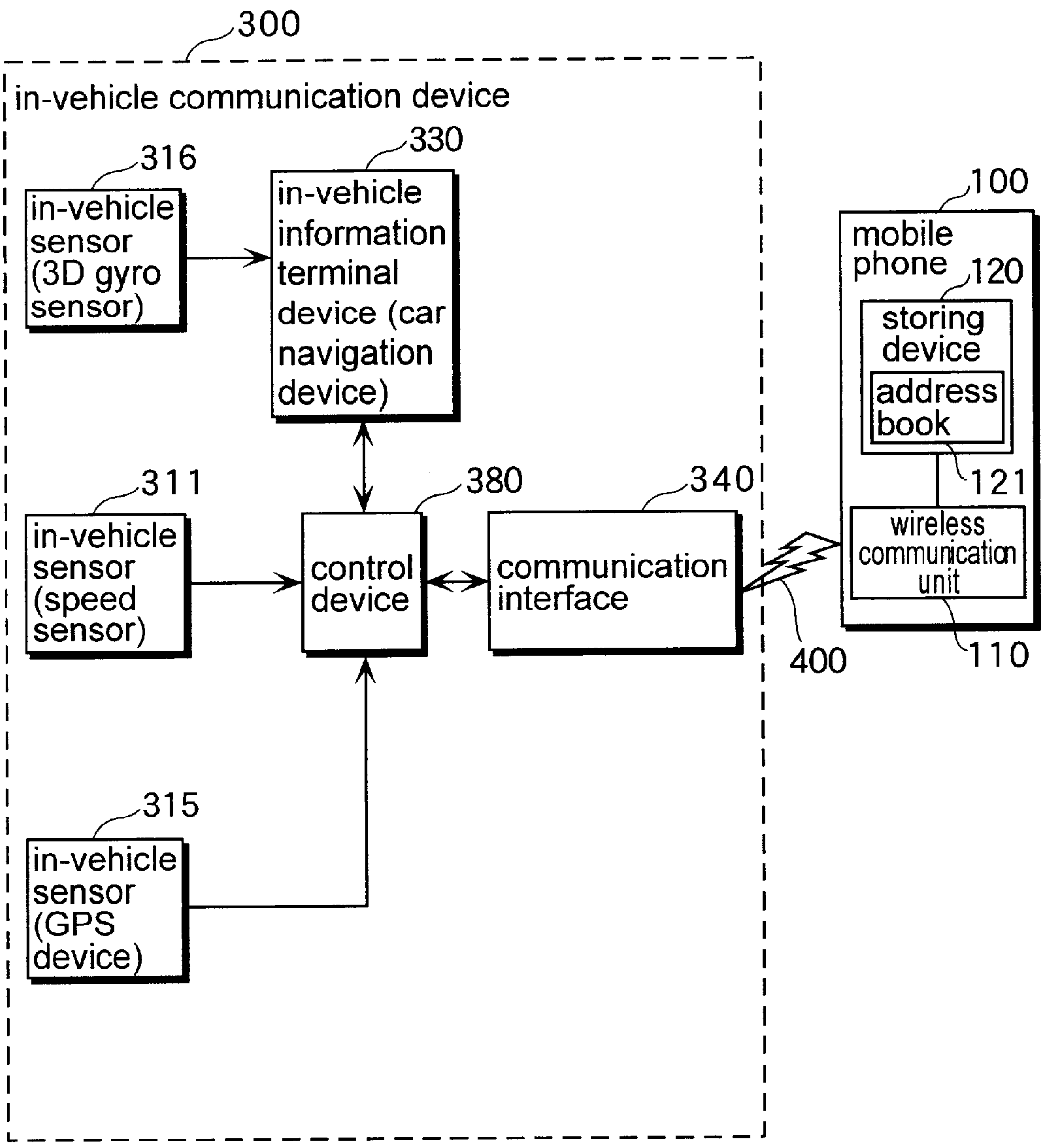
FIG. 12 is a block diagram that shows further another functional structure of the in-vehicle communication device 300 that is structured according to the setting on the answer message setting table 372.

Therefore, the structure in the case where the speed sensor, the 3D gyro sensor, etc. are only set for the danger judgment, the vehicle current location of the GPS device 315 is only set for the vehicle information, and the e-mail answer is set, is equivalent to that of the in-vehicle communication device 300 as shown in FIG. 12, in which the speed sensor 311, the GPS device 315 and the 3D gyro sensor 316 connected to the car navigation device 330 are connected to the control device 380, the control device 380 judges based on the detection results of the speed sensor 311 and the 3D gyro sensor 316 (such as the speed and the vertical movements, etc.) only whether it is dangerous or not for the driver to answer a call when the mobile phone 100 receives the incoming call, and when it judges it to be dangerous, it embeds the vehicle current location detected by the GPS device 315 and the results held by the car navigation device 330 (such as the destination, the estimated arrival time, etc.) into the answer message to send an e-mail to the caller's e-mail address.

Figure 13:
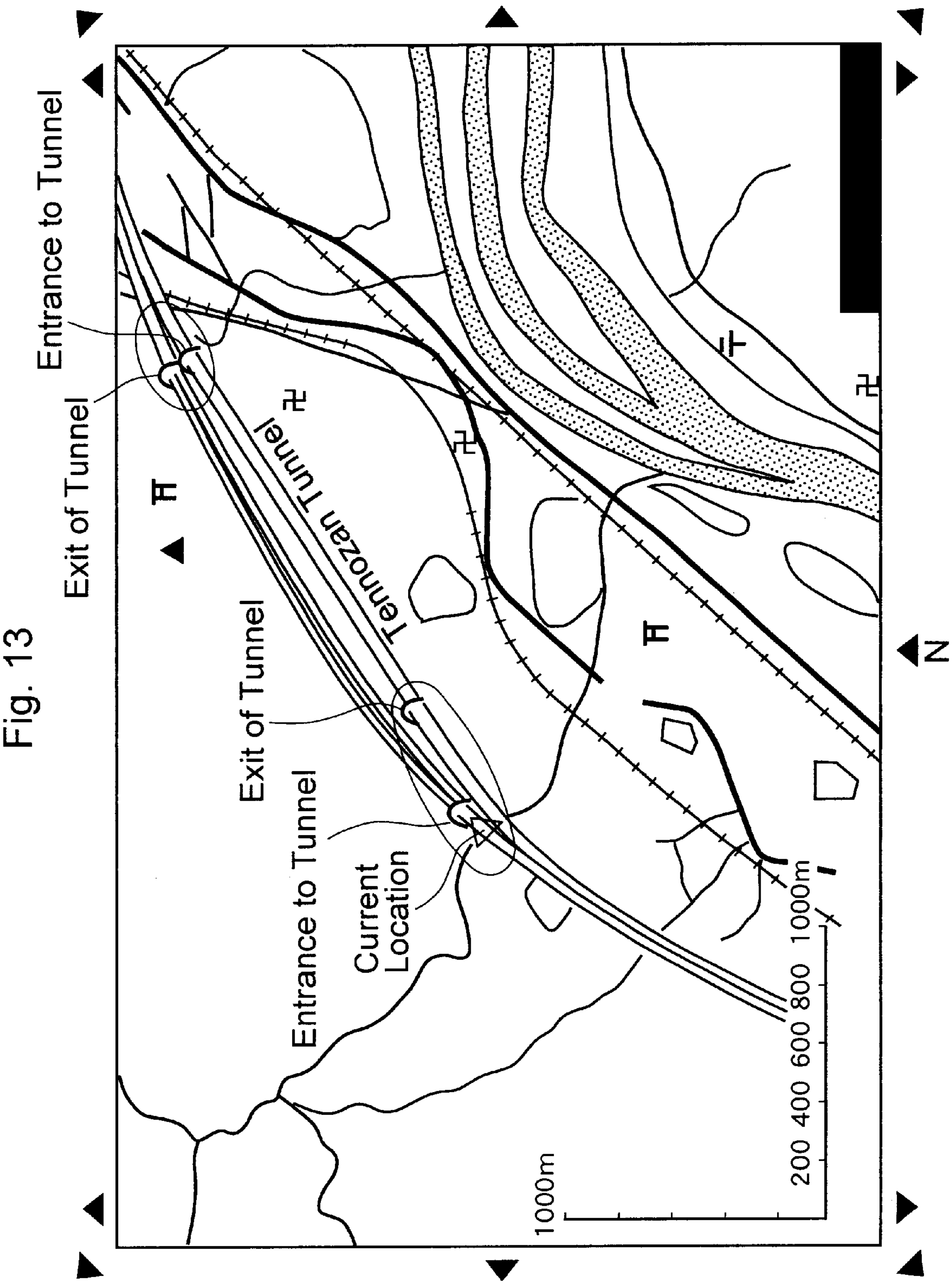
FIG. 13 is a diagram that shows a structure sample of map data 373 that is stored in the storing device 370.

Furthermore, when the zone detection is only set for the danger judgment, the current location held by the car navigation device 330, etc. is set for the vehicle information, and the e-mail answer is set for the answer type on the answer message setting table 372, for example, the GPS device 315 and the map data 373 are used for the zone detection. The control device 380 uses whether the current location of the vehicle obtained from the GPS device 315 is in the dangerous zone specified by the map data 373 or not (whether it is in the zone available for the automatic answer or not) as the vehicle condition. Here, it is possible to preset locations such as just before a tunnel, on an expressway, just before a tollgate, at an intersection, etc. as the zones available for the automatic answer indicated by the corresponding zones on the map. When the current location of the vehicle is in the zone near the entrance to the Tennozan Tunnel on the Meishin Expressway, for example, as shown in FIG. 13, it is possible to control the system to answer automatically, and therefore, the driver's safety is secured.

In this case, other sensors (such as the speed sensor 311, the acceleration sensor 312, the rudder sensor 313 and the parking brake condition detecting sensor 314), other vehicle information and the voice answer are not used.

Figure 14:
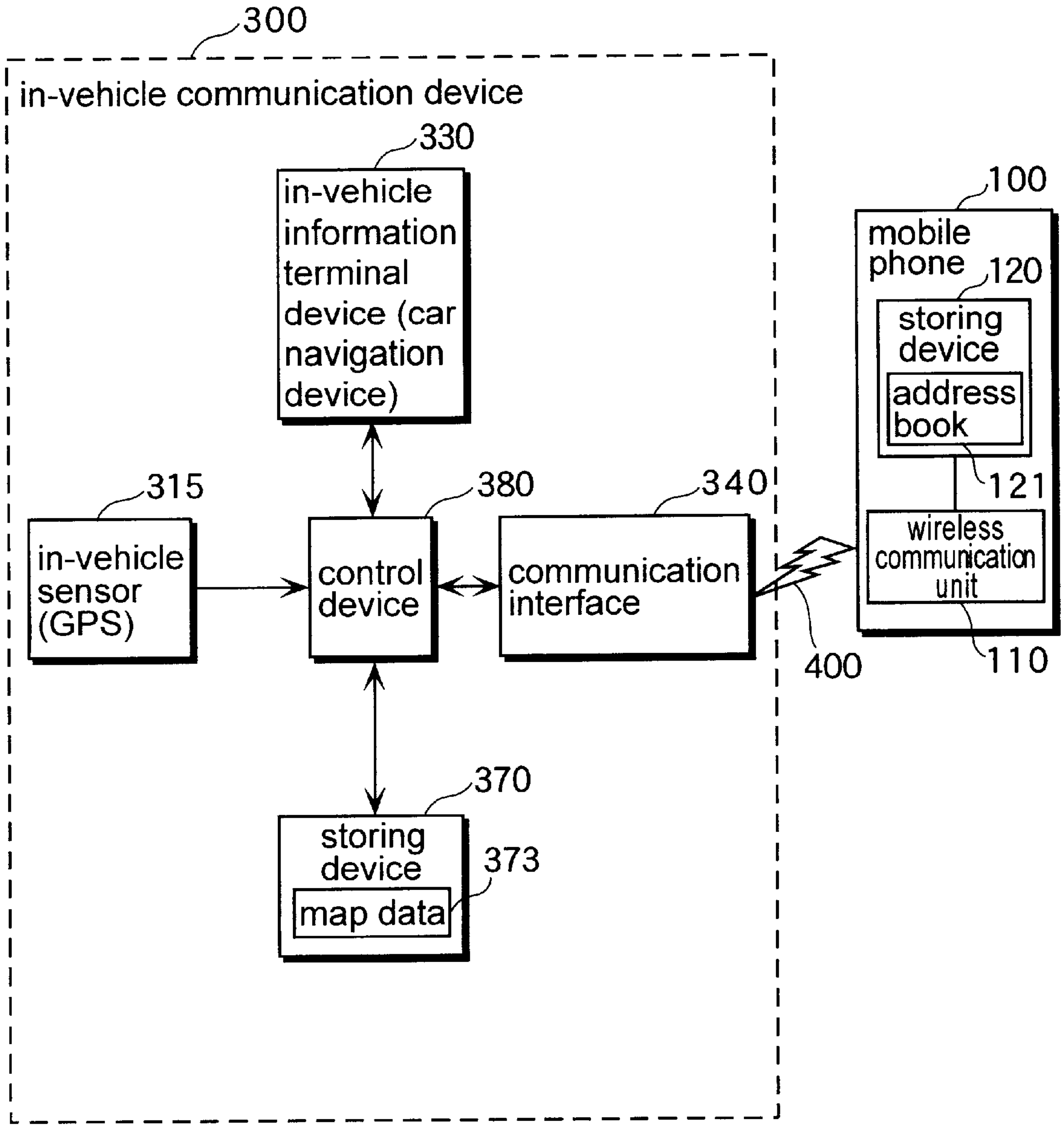
FIG. 14 is a block diagram that shows further another functional structure of the in-vehicle communication device 300 that is structured according to the setting on the answer message setting table 372 (zone designation).

Therefore, the structure in the case where the zone is only set for the danger judgment, the current location of the vehicle on the GPS device 315 is only set for the vehicle information, and the e-mail answer is set, is equivalent to that of the in-vehicle communication device 300 as shown in FIG. 14, in which the GPS device 315, the car navigation device 330 and the storing device 370 are only connected to the control device 380, the control device 380 judges based on the current location of the vehicle detected by the GPS device 315 and the current location indicated on the map data 373 only whether it is dangerous or not for the driver to answer a call when the mobile phone 100 receives the incoming call, and when it judges it to be dangerous, it embeds the results held by the car navigation device 330 (such as the current location and the estimated arrival time) into the answer message to send an e-mail to the caller's e-mail address.

Note that the structure in the case where the voice answer is set for the answer type is equivalent to the structure including the mobile phone 100 without the storing device 120.

In the in-vehicle communication device 300 as structured as above, explanation will be given below on the procedure for giving an automatic answer of useful information (vehicle information) to a caller according to a driver's driving condition at the time when the mobile phone 100 receives an incoming call.

Figure 15:
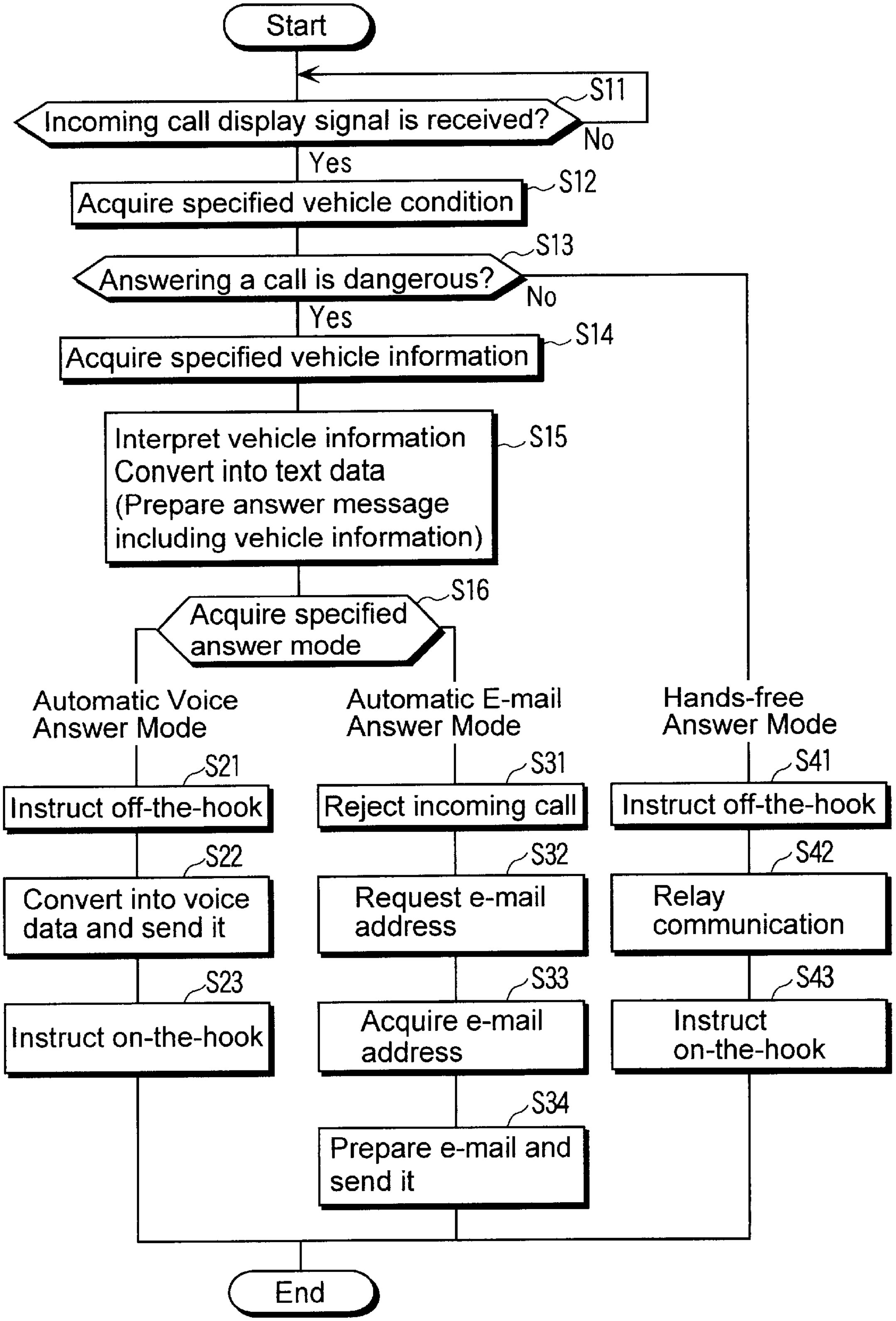
FIG. 15 is a flow chart that shows processing that a control device executes.

FIG. 15 is a flow chart that shows operations that a control device executes.

The control device 380 waits for an incoming call to the mobile phone 100 (No in S11). When there is an incoming call, the mobile phone 100 outputs an incoming call display signal (a caller's number) via the wireless communication unit 110 and the wireless communication path 400, and the control device 380 receives the incoming call display signal via the communication interface 340 to detect the incoming call.

Once detecting the incoming call (Yes in S11), the control device 380 acquires the vehicle conditions of the in-vehicle sensors according to the setting of the answer message setting table 372 (S12), and judges whether it is dangerous or not for the driver to answer the call (S13).

Here, the judging method in Step S13 is as follows. When the control device 380 makes the danger judgment based on the speed sensor 311 only, for example, it may judge it to be dangerous when the speed detected by the speed detection signal is beyond a predetermined threshold value (0 or a certain value). Also, when the control device 380 makes the danger judgment based on the parking brake condition detecting sensor 314 only, it may judge it to be dangerous unless the vehicle stops. In this embodiment, the vehicle conditions of the in-vehicle sensors are acquired according to the setting of the answer message setting table 372 (S12) when the incoming call is detected (Yes in S11). However, the vehicle conditions of the in-vehicle sensors have been acquired according to the setting of the answer message setting table 372 (S12), and then it may be judged whether it is dangerous or not for the driver to answer the call based on the acquired vehicle conditions of the in-vehicle sensors when the incoming call is detected (Yes in S11).

When a plurality of sensors (such as the speed sensor 311, the acceleration sensor 312, the rudder sensor 313, the parking brake condition detecting sensor 314) are set on the answer message setting table 372, the danger judgment is made using not only the operation condition of the parking brake but also the information corresponding to the danger such as the speed and the acceleration. As a result, the danger is accurately judged, and therefore, troubles can be avoided such that the automatic answer starts for the call to the driver in spite of a not-dangerous condition, and on the contrary, the driver has to answer the call because the automatic answer does not start in spite of a dangerous condition.

When the control device 380 judges it to be dangerous in Step S13, it acquires the specified vehicle information according to the setting of the answer message setting table 372 (S14). When the car navigation device 330 is set, the control device 380 requests the car navigation device 330 to send the vehicle information. Once receiving the request from the control device 380, the car navigation device 330 sends the requested vehicle information to the control device 380. Here, the vehicle information is the information held by the car navigation device and the information which can be obtained via the car navigation device (the information obtained by the VICS, for example) when the in-vehicle information terminal device 330 is the car navigation device. In other words, the vehicle information is the location information of the destination set on the car navigation device 330, the route information to the destination, the vehicle current location information, and others. Also, the VICS terminal 320 is connected to the car navigation device, the vehicle information may be the information on the destination and the estimated arrival time by calculating the estimated arrival time to the destination based on the traffic information, the route information, etc. When the vehicle information is the sensor information, that is, the GPS device 315 is set, for example, the vehicle information is the current location. If another sensor is set, the vehicle information shall be the information of that sensor.

Once acquiring the vehicle information in Step S14, the control device 380 interprets the vehicle information and generates a text in which the interpreted vehicle information is embedded ("the current location is XXX. The destination is ○○○. The estimated arrival time is ΔΔΔ.", for example,) (S15).

Note that a plurality of templates according to the danger setting and the vehicle information setting may be prepared in advance so as to embed the ever-changing vehicle information into those templates and generate a message.

Generation of the answer message (text data) is completed, the control device 380 refers to the answer mode of the answer message setting table 372 and judges whether the answer mode is voice or not (S16).

Figure 16:
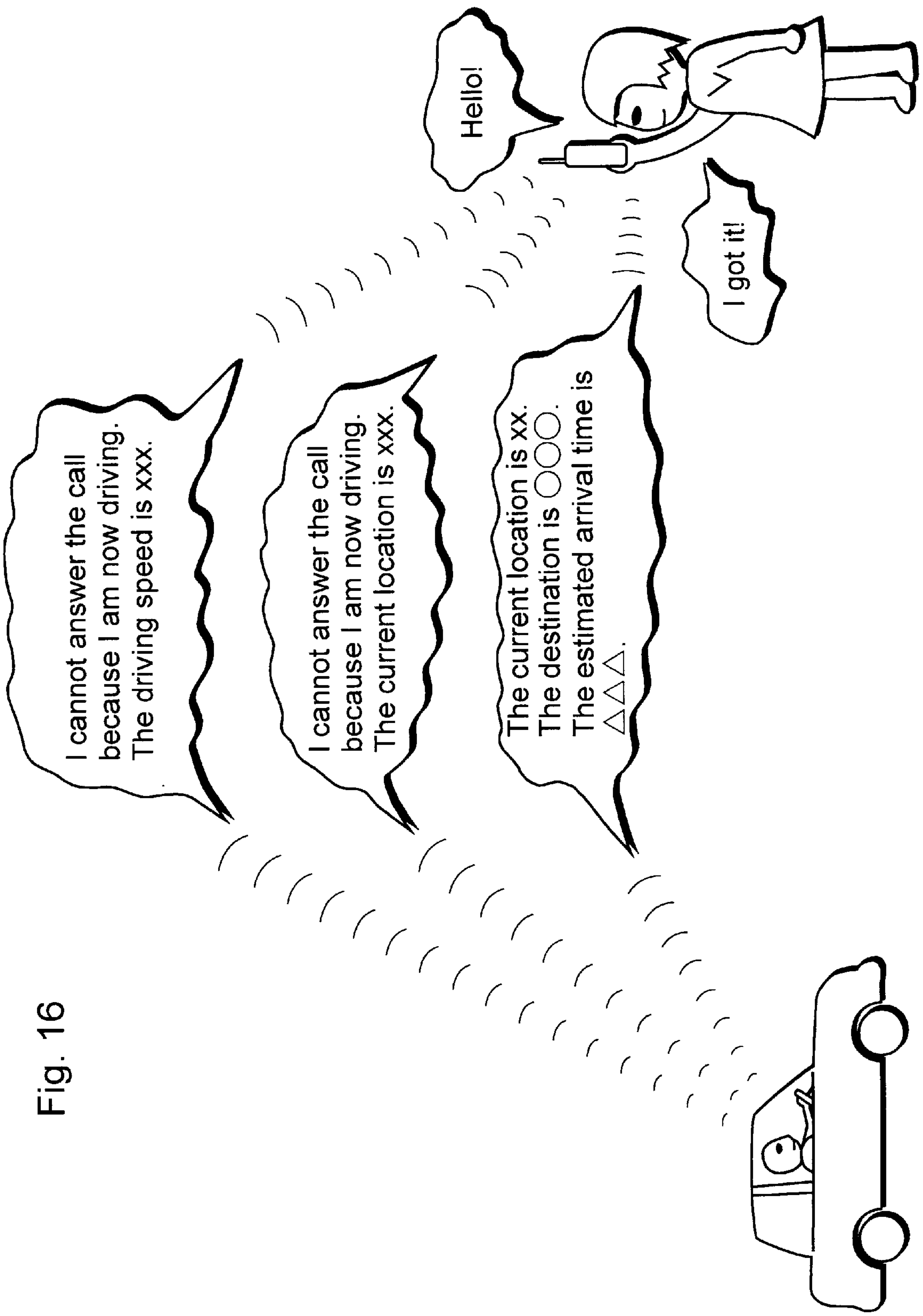
FIG. 16 is a diagram that shows a sample of an answer message (voice) that is sent to a caller.
Figure 17:
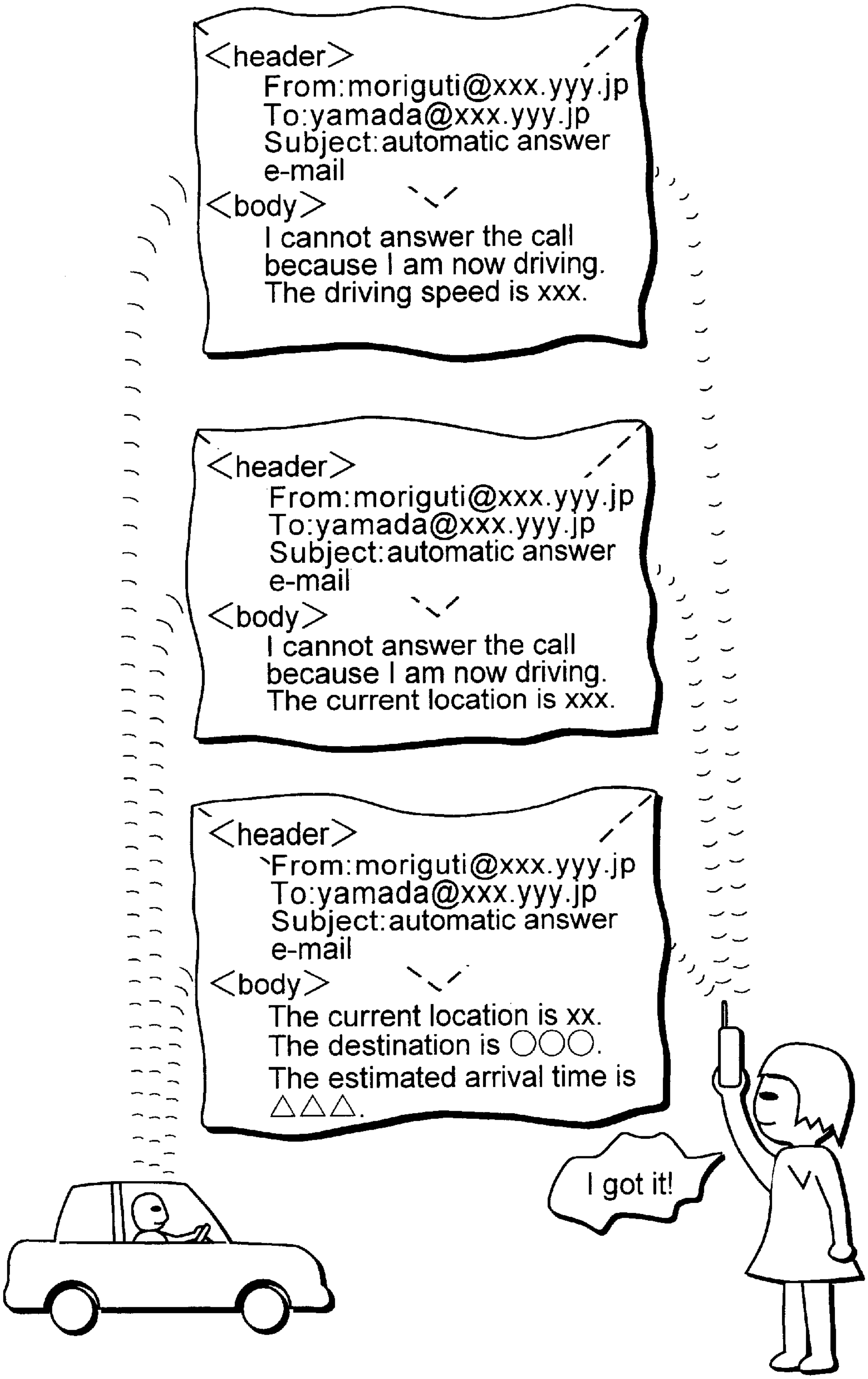
FIG. 17 is a diagram that shows a sample of an answer message (e-mail) that is sent to a caller.

When the answer mode is set to be the voice mode, the control device 380 instructs the mobile phone 100 via the communication interface 340 to answer the incoming call (set the off-the-hook state) (S21). Once receiving the instruction, the mobile phone 100 sets the off-the-hook state, and as a result, it becomes communicable with the caller. Once giving the instruction, the control device 380 converts the text data into the voice data of PCM (Pulse Code Modulation; $\mu$-Law, A-Law) or ADPCM (Adaptive differential Pulse Code Modulation), and sends the voice data to the mobile phone 100 via the communication interface 340 and the wireless communication path 400 (S22). The mobile phone 100 receives the voice data and sends it to the caller. The voice data is, for example, the message such as "I cannot answer the call because I am now driving. The driving speed is XXX.", "I cannot answer the call because I am now driving. The current location is XXX.", "The current location is XX. The destination is ○○○. The estimated arrival time is ΔΔΔ.", etc., as shown in FIG. 16. As a result, the answer message in which the vehicle information at that time is embedded is delivered to the caller as the voice data. Accordingly, the caller can obtain the useful information, that is, the vehicle information at that time (such as the speed, the current location and the estimated arrival time). Note that the format of the voice data is not limited to PCM and ADPCM, but it may be other formats (such as CVSD (Continuous Variable Slope Delta Modulation)).

As a result, when the driver cannot answer the call, the information depending upon the vehicle running condition at that time, not the fixed message, can be sent back to the caller. Therefore, the caller can obtain fresher and more information than the fixed message on the driver and the vehicle conditions, and is relieved from anxiety and uneasiness.

Once completing sending the voice data, the control device 380 instructs the mobile phone 100 to set the on-the-hook state (S23) and completes the answer processing.

On the other hands, when the answer mode is set to be the e-mail mode in Step S16, the control device 380 instructs the mobile phone 100 to reject the incoming call via the communication interface 340 and the wireless communication path 400 (S31), releases the telephone network, and then requests the e-mail address corresponding to the caller's phone number ("090Δ□◇◇", for example) (S32). The mobile phone 100 searches the address book 121 of the storing device 120, and notifies the control device 380 of the corresponding e-mail address (yamada@xxx.yyy.jp, for example) via the communication interface 340. Once acquiring the e-mail address by this information (S33), the control device 380 stores the acquired e-mail address in the e-mail header ("To" field) to complete preparing the e-mail, and sends the e-mail to the mobile phone 100 via the communication interface 340 and the wireless communication path 400 (S34). The mobile phone 100 receives this e-mail and sends it to the caller.

More specifically, this e-mail includes, for example, a header "From: moriguti@xxx.yyy.jp, To: yamada@xxx.yyy.jp, and Subject: automatic answer e-mail" and a body "I cannot answer the call because I am now driving. The driving speed is XXX." Or, it includes the same header as above and a body "I cannot answer the call because I am now driving. The current location is XXX.", or the same header as above and a body "The current location is XX. The destination is ○○○. The estimated arrival time is ΔΔΔ." The answer message in which the vehicle information at that time is embedded is delivered to the caller by this e-mail. Therefore, the caller can obtain the useful information, that is, the vehicle information at that time (such as the speed, the current location and the estimated arrival time). As a result, the caller can not only obtain the information on the vehicle running condition, that is, the condition that the driver is driving the vehicle, but also anticipate to some extent how long the condition will continue, and therefore, can wait for the driver's answer without feeling anxiety or uneasiness. In addition, the e-mail answer can avoid a reception error such as missing hearing or hearing wrong which may occur in the case of the automatic voice answer, and therefore, the caller can understand the driver's condition without fail.

Note that in sending the e-mail, the digital image of the driver, etc. which is taken by the mobile phone 100 may be attached to the e-mail. In this case, the caller can also obtain the vehicle information at that time by the digital image of the driver.

On the other hand, when the control device 380 judges it to be not dangerous, that is, safe for the driver to answer the call in Step S13, it instructs the mobile phone 100 to set the off-the-hook state (S41), and relays communication between the mobile phone 100 and the earphone-type microphone 200 (S42). In this case, the driver can hear or talk to the caller with his hands-free. After the conversation is completed, the control device 380 instructs the mobile phone 100 to set the on-the-hook state (S43), and completes the hands-free answer mode.

As a result, according to the hands-free system of the first embodiment for the present invention, the in-vehicle communication device can be realized that can provide the caller automatically with the message or the e-mail including the useful information when the in-vehicle telephone device or the mobile telephone device connected to the vehicle receives an incoming call and it is dangerous for the driver to answer the call because he is driving, and as a result, there is a merit that the call can be automatically answered by the voice or the e-mail including the useful information according to the driver's driving condition, In the first embodiment, the vehicle information is obtained (S14) and then the e-mail address is obtained (S33) in this order in the first embodiment. However, the vehicle information may be obtained after the e-mail address is obtained in the reverse order, or both may be obtained in parallel.

The Second Embodiment

Figure 18:
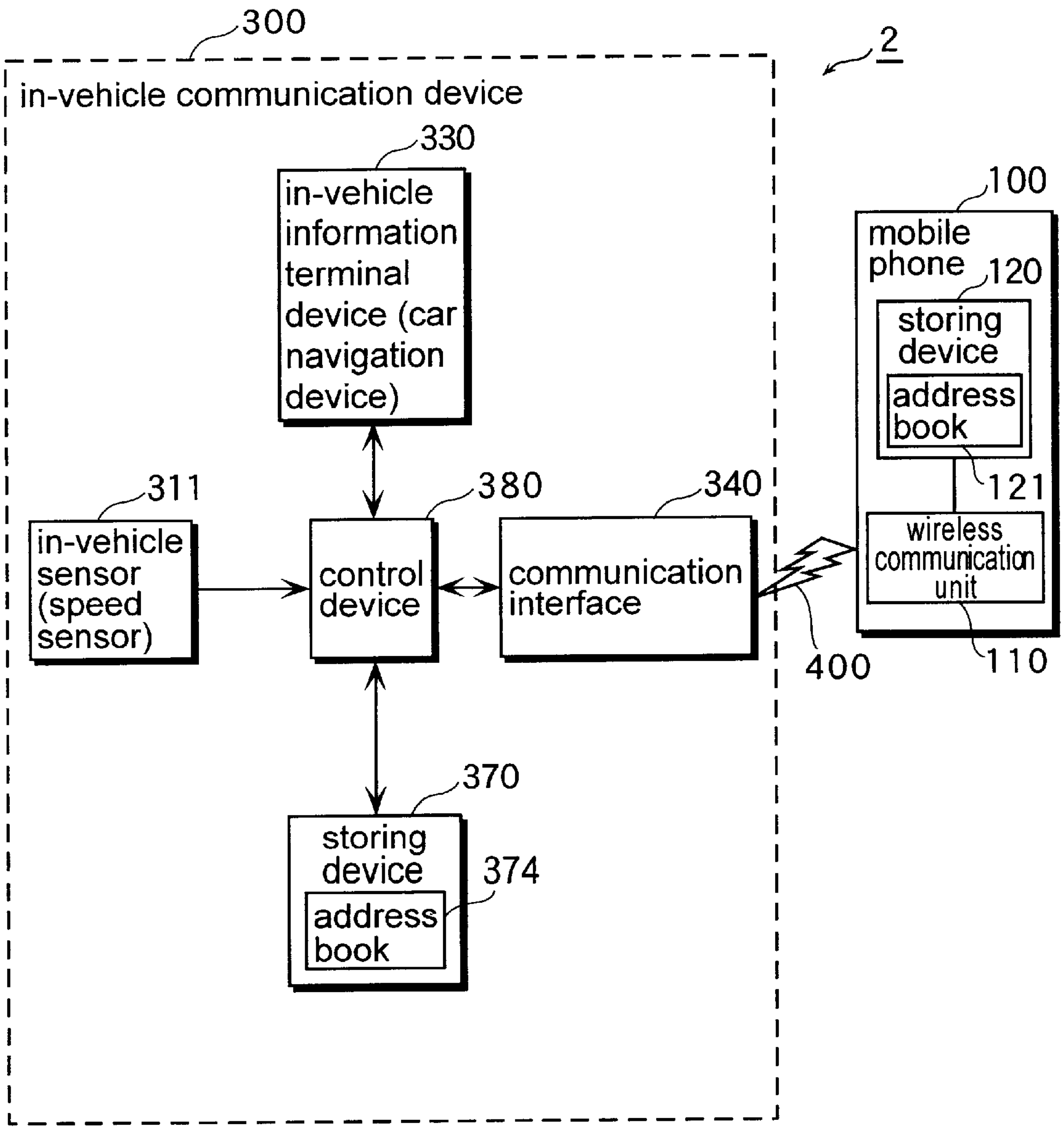
FIG. 18 is a diagram that shows an overall structure of a hands-free system according to the second embodiment of the present invention.

FIG. 18 is a diagram that shows an overall structure of a hands-free system according to the second embodiment of the present invention. Note that the earphone-type microphone 200 is omitted here in this figure.

An e-mail address is acquired from the address book 121 of the mobile phone 100 according to the hands-free system 1 of the first embodiment. However, according to the hands-free system 2, an address book 374 having the same structure as the address book 121 is stored in the storing device 370, and the control device 380 searches this address book 374 with a telephone number as a search key, and acquires the e-mail address corresponding to that telephone number when it sends an e-mail. This address 374 may be prepared by copying the address book 121, or may be prepared independently of the address book 121. As structured above, the in-vehicle communication device can, of course, be realized that can provide the caller automatically with the message or the e-mail including the useful information when the in-vehicle telephone device or the mobile phone connected to the vehicle receives an incoming call and it is dangerous for the driver to answer the call because he is driving. In addition, in the structure as shown in FIG. 18, the time to inquire the mobile phone 100 of the address or to return the address can be shortened. As a result, there is a merit that a response to an e-mail message is speeded up.

The Third Embodiment

Figure 19:
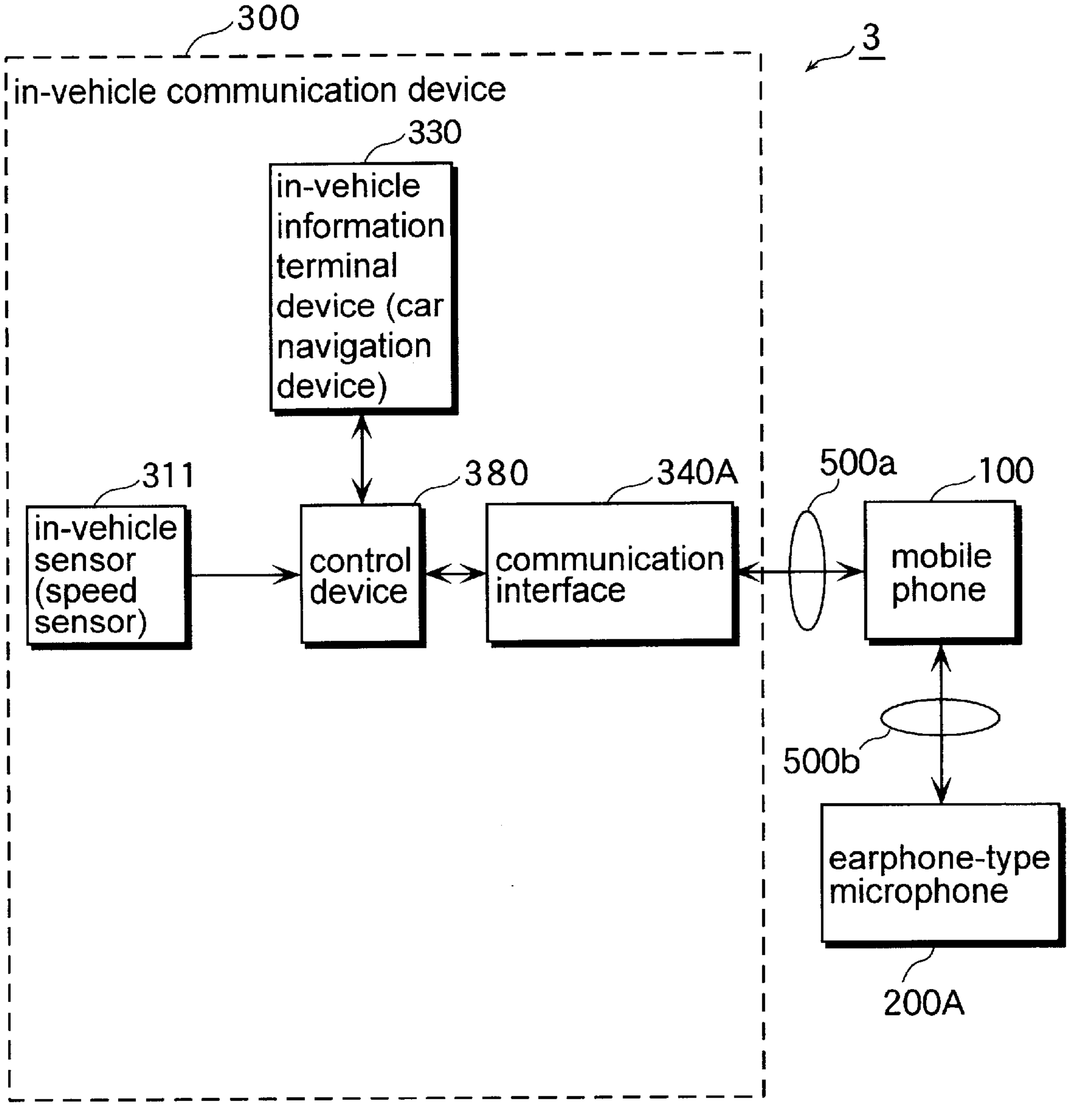
FIG. 19 is a diagram that shows an overall structure of a hands-free system according to the third embodiment of the present invention.

FIG. 19 is a diagram that shows an overall structure of a hands-free system according to the third embodiment of the present invention.

In the hands-free systems 1 and 2 according to the first and second embodiments, the mobile phone 100 and the in-vehicle communication device 300 are connected via the wireless communication path 400 so as to communicate with each other. On the other hand, in the hands-free system 3, the mobile phone 100 and the in-vehicle communication device 300 are connected by a cable communication path 500*a* (such as a 16-conductor cable) so as to communicate with each other. In this case, the 16-conductor connection interface that is standard equipment on the mobile phone can be used for the mobile phone 100 as it is, and the communication interface 340A of the in-vehicle communication device 300 may be changed to a 16-conductor interface.

The mobile phone 100 and the earphone-type microphone 200 are connected by the cable communication path 500*b*. In this case, a 3-plug or 4-plug connector that is standard equipment on a mobile phone can be used for the mobile phone 100 as it is, and a 3-plug or 4-plug pin jack, instead of the wireless communication unit 230, may be used for the earphone-type microphone 200.

As structured as above, the in-vehicle communication device can, of course, be realized that can provide the caller automatically with a message or an e-mail including useful information when the in-vehicle telephone device or the mobile phone connected to the vehicle receives an incoming call and it is dangerous for the driver to answer the call because he is driving. In addition, there is a merit that the mobile phone 100, the earphone-type microphone 200 and the in-vehicle communication device 300 of the hands-free system 3 can be structured at a lower cost.

The Fourth Embodiment

Figure 20:
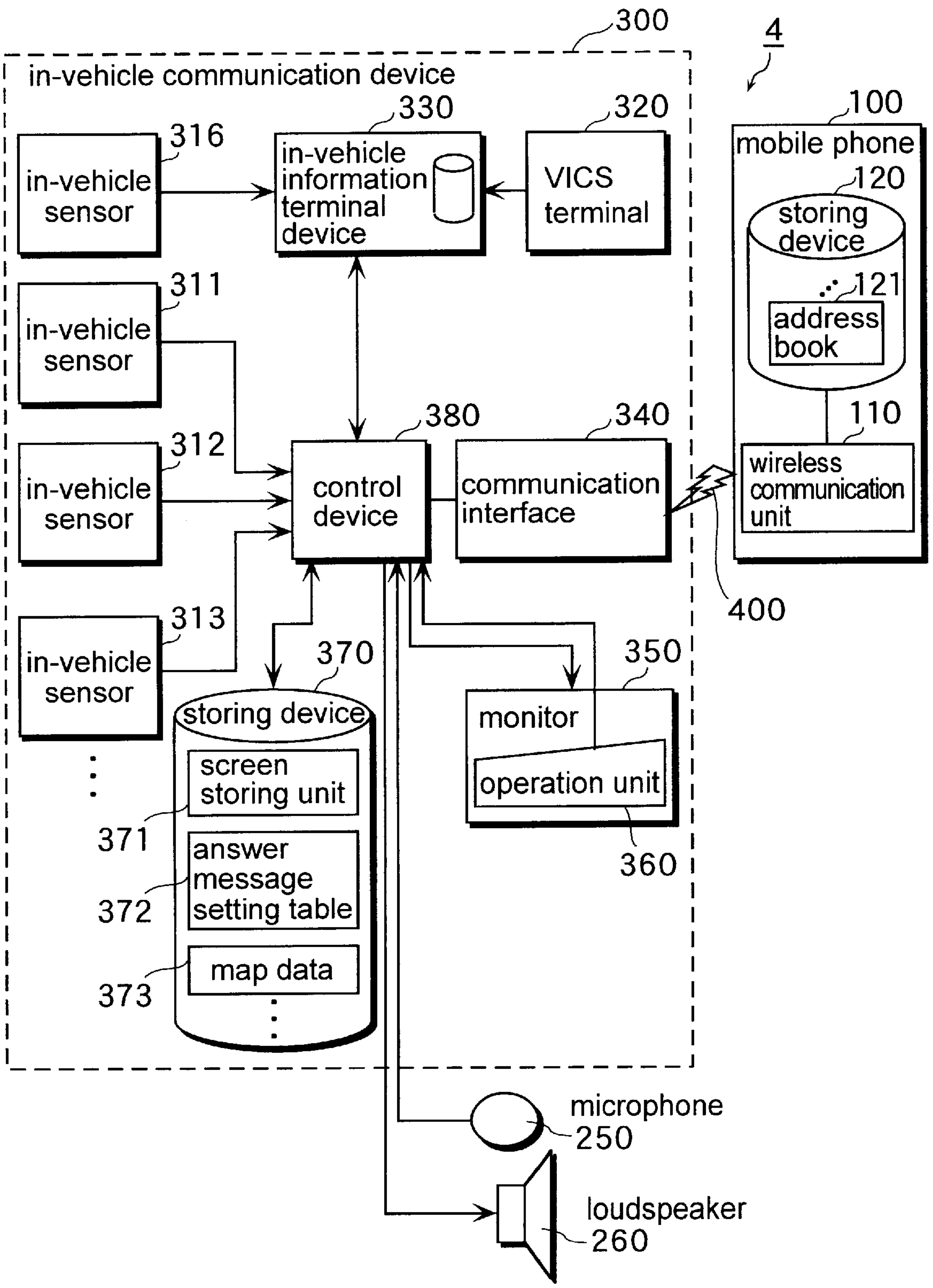
FIG. 20 is a diagram that shows an overall structure of a hands-free system according to the fourth embodiment of the present invention.

FIG. 20 is a diagram that shows an overall structure of a hands-free system according to the fourth embodiment of the present invention.

In the hands-free systems 1, 2 and 3, the earphone-type microphone 200 is used. On the other hands, in the hands-free system 4 according to the fourth embodiment of the present invention, a microphone 250 and a loudspeaker 260, instead of the earphone-type microphone 200, are connected directly to the control device 380. In this case, since the control device 380 can relay communication between a driver and a caller using the microphone 250 and the loudspeaker 260 that are standard equipment on a vehicle, there is a merit that the hands-free system 4 can virtually be structured at a low cost.

Although a mobile phone is connected to a communication interface in the above explanation, a telephone that is fixedly installed in a vehicle can also answer automatically in the same manner as above.

Also, although the wireless communication path 400 is embodied by Bluetooth Piconet in the above explanation, it may be embodied by a wireless communication path by IrDA or the like.

Furthermore, although either a voice answer or an e-mail answer can be selected in the above embodiments, both can be selected. An in-vehicle communication device can also be realized with an answer function by either a voice or an e-mail.

What is claimed is:

1. An in-vehicle communication device that automatically answers a caller device that sends a call when a telephone device located in a vehicle receives the call comprising:

an in-vehicle sensor that detects a vehicle condition;

a communication interface for the telephone device; and a control device that controls the telephone device via the communication interface, wherein the control device acquires a vehicle condition which is detected by the in-vehicle sensor, judges whether a driver's answering the call is dangerous or not based on the acquired vehicle condition when the control device detects the call to the telephone device, prepares an answer message including vehicle information that depends upon a running condition of the vehicle at the time when the control device judges that the driver's answering the call is dangerous, and sends the prepared answer message to the caller device.

2. The in-vehicle communication device according to claim 1, wherein the control device judges that the driver's answering the call is dangerous when the vehicle condition detected by the in-vehicle sensor goes beyond a predetermined threshold value.

3. The in-vehicle communication device according to claim 2, wherein the threshold value is variable.

4. The in-vehicle communication device according to claim 1, wherein the vehicle condition includes at least one of a speed, an acceleration, a steering wheel angle, an operational condition of a parking brake, vertical, lateral and longitudinal movements of the vehicle, and whether the vehicle is in a dangerous zone or not, and the control device judges whether the driver's answering the call is dangerous or not based on a judgment using one of these vehicle conditions or an overall judgment using a combination of two or more vehicle conditions.

5. The in-vehicle communication device according to claim 1 further comprising a map information storing unit operable to store map information that specifies divided zones indicating whether the driver's answering the call is dangerous or not, wherein the control device uses, as the vehicle condition, whether a current location of the vehicle is in a dangerous zone specified by the map information or not.

6. The in-vehicle communication device according to claim 1 further comprising an in-vehicle information terminal device which is located in a vehicle, wherein the control device prepares the answer message by reading out vehicle information from the in-vehicle information terminal device.

7. The in-vehicle communication device according to claim 6, wherein the in-vehicle information terminal device is a car navigation device, and the control device uses, as vehicle information, (A) at least one of (i) a destination, (ii) a route to the destination, (iii) a current location, (iv) a distance to the destination and (v) an estimated arrival time to the destination, which are held by the car navigation device; or (B) a combination of the vehicle condition and at least one of (i) (ii) (iii) (iv) and (v).

8. The in-vehicle communication device according to claim 7, wherein the vehicle information includes information indicating the vehicle condition.

9. The in-vehicle communication device according to claim 1, wherein the control device sends the answer message in a form of an e-mail to the caller device.

10. The in-vehicle communication device according to claim 9, wherein the control device acquires an e-mail address of the caller from the telephone device, and sends the e-mail to the acquired e-mail address.

11. The in-vehicle communication device according to claim 9 further comprising an address book storing unit operable to store in advance an address book in which a telephone number and a corresponding e-mail address are registered, wherein the control device specifies an e-mail address of the caller device by referring to the address book stored in the address book storing unit based on a telephone number of the caller, and sends the e-mail to the e-mail address of the caller.

12. The in-vehicle communication device according to claim 9, wherein the control device judges that the driver's answering the call is dangerous when the vehicle condition detected by the in-vehicle sensor goes beyond a predetermined threshold value.

13. The in-vehicle communication device according to claim 12, wherein the threshold value is variable.

14. The in-vehicle communication device according to claim 9, wherein the vehicle condition includes at least one of a speed, an acceleration, a steering wheel angle, an operational condition of a parking brake, vertical, lateral and longitudinal movements of a vehicle and whether the vehicle is in a dangerous zone or not, and the control device judges whether the driver's answering the call is dangerous or not based on a judgment using one of these vehicle conditions or an overall judgment using a combination of two or more vehicle conditions.

15. The in-vehicle communication device according to claim 9 further comprising a map information storing unit operable to store map information that specifies divided zones indicating whether the driver's answering the call is dangerous or not, wherein the control device uses, as the vehicle condition, whether a current location of the vehicle is in a dangerous zone specified by the map information or not.

16. The in-vehicle communication device according to claim 9 further comprising an in-vehicle information terminal device which is located in a vehicle, wherein the control device prepares the answer message by reading out the vehicle information from the in-vehicle information terminal device.

17. The in-vehicle communication device according to claim 16, wherein the in-vehicle information terminal device is a car navigation device, and the control device uses, as vehicle information, (A) at least one of (i) a destination, (ii) a route to the destination, (iii) a current location, (iv) a distance to the destination and (v) an estimated arrival time to the destination, which are held by the car navigation device; or (B) a combination of the vehicle condition and at least one of (i) (ii) (iii) (iv) and (v).

18. The in-vehicle communication device according to claim 17, wherein the vehicle information includes information indicating the vehicle condition.

19. The in-vehicle communication device according to claim 1, wherein the communication interface is a wireless communication interface.

20. The in-vehicle communication device according to claim 19, wherein the communication interface is Bluetooth.

21. The in-vehicle communication device according to claim 1, wherein the communication interface is a 16-conductor cable communication interface.

22. A communication control method for a hands-free device that automatically answers a caller device that sends a call when a telephone device located in a vehicle receives the call, the communication control method including:

a detecting step for detecting a vehicle condition; and a control step for controlling the telephone device via the communication interface, wherein in the control step, the vehicle condition which is detected in the detecting step is acquired, whether a driver's answering the call is dangerous or not is judged based on the acquired vehicle condition when the call to the telephone device is detected, an answer message including vehicle information that depends upon a running condition of the vehicle at the time when the driver's answering the call is judged to be dangerous is prepared, and the prepared answer message is sent to the caller device.

23. The communication control method according to claim 22, wherein in the control step, the driver's answering the call is judged to be dangerous when the vehicle condition detected in the detecting step goes beyond a predetermined threshold value.

24. The communication control method according to claim 22, wherein the hands-free device further comprises an in-vehicle information terminal device which is located in a vehicle, and in the control step, the answer message is prepared by reading out the vehicle information from the in-vehicle information terminal device.

25. The communication control method according to claim 22, wherein in the control step, the answer message is sent to the caller device in a form of an e-mail.

26. A program for controlling communication for a hands-free device that automatically answers a caller device that sends a call when a telephone device located in a vehicle receives the call, the program including:

a detecting step for detecting a vehicle condition; and a control step for controlling the telephone device via the communication interface, wherein in the control step, the vehicle condition which is detected in the detecting step is acquired, whether the driver's answering the call is dangerous or not is judged based on the acquired vehicle condition when the call to the telephone device is detected, an answer message including vehicle information that depends upon a running condition of the vehicle at the time when the driver's answering the call is judged to be dangerous is prepared, and the prepared answer message is sent to the caller device.

* * * * *